US012080492B2

(12) United States Patent
Yang et al.

(10) Patent No.: US 12,080,492 B2
(45) Date of Patent: Sep. 3, 2024

(54) KEYSWITCH STRUCTURE AND LIFT MECHANISM THEREOF

(71) Applicant: DARFON ELECTRONICS CORP., Taoyuan (TW)

(72) Inventors: Chen Yang, Taoyuan (TW); Ling-Hsi Chao, Taoyuan (TW); Shao-Lun Hsiao, Taoyuan (TW); Yu-Chun Hsieh, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/989,703

(22) Filed: Nov. 18, 2022

(65) Prior Publication Data

US 2023/0197373 A1 Jun. 22, 2023

Related U.S. Application Data

(60) Provisional application No. 63/356,558, filed on Jun. 29, 2022, provisional application No. 63/361,375, filed on Dec. 16, 2021.

(30) Foreign Application Priority Data

Aug. 31, 2022 (TW) ................................ 111132826

(51) Int. Cl.
*H01H 13/12* (2006.01)
*H01H 13/7073* (2006.01)
*H01H 13/83* (2006.01)

(52) U.S. Cl.
CPC ........ *H01H 13/83* (2013.01); *H01H 13/7073* (2013.01)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS 5,278,371 A 1/1994 Watanabe
6,444,933 B1 * 9/2002 Chun .................... H01H 3/125
200/344

(Continued)

FOREIGN PATENT DOCUMENTS

CN 2423647 Y 3/2001
CN 202523604 U 11/2012

(Continued)

OTHER PUBLICATIONS

Yang, the specification, including the claims, and drawings in the U.S. Appl. No. 18/071,533, filed Nov. 29, 2022.

(Continued)

*Primary Examiner* — Ahmed M Saeed
(74) *Attorney, Agent, or Firm* — Winston Hsu

(57) ABSTRACT

A keyswitch structure includes a lift mechanism and a keycap. Two supports of the lift mechanism support the keycap. There can be a spring structure connecting the two supports for driving the two supports to lift the keycap. The lift mechanism defines a central space extending through the whole lift mechanism in a vertical direction. The spring structure does not enter the central space. The two supports abut against and constrain each other through corresponding structures, to mutually rotate with respect to a rotation axis. The keyswitch structure can include a switch. The switch includes an intermediate support, detachably abutting downward against the lift mechanism or the keycap, and a resilient part, detachably abutting downward against the intermediate support. In the process of pressing the keycap, the intermediate support is separated from the lift mechanism or the keycap, so that the contact force of the switch can be maintained constant.

16 Claims, 19 Drawing Sheets

(58) Field of Classification Search
CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 9,634,661 | B1 | 4/2017 | Chen | |
| 9,952,682 | B2 | 4/2018 | Zhang | |
| 10,509,482 | B1 | 12/2019 | Tsai | |
| 11,114,260 | B2 | 9/2021 | Li | |
| 11,342,134 | B2 | 5/2022 | Ruff | |
| 11,721,500 | B2 | 8/2023 | Chang | |
| 2001/0007301 | A1 * | 7/2001 | Sato | H01H 3/122 200/344 |
| 2005/0217983 | A1 | 10/2005 | Hsu | |
| 2017/0264294 | A1 | 9/2017 | Li | |
| 2019/0267200 | A1 | 8/2019 | Wu | |
| 2020/0294733 | A1 | 9/2020 | Ruff | |
| 2020/0328044 | A1 * | 10/2020 | Chao | H01H 13/705 |
| 2020/0381190 | A1 | 12/2020 | Ruff | |
| 2020/0395178 | A1 | 12/2020 | Chao | |
| 2020/0402735 | A1 | 12/2020 | Chuang | |
| 2023/0197372 | A1 | 6/2023 | Yang | |

FOREIGN PATENT DOCUMENTS

| | | | |
|---|---|---|---|
| CN | 104299828 | A | 1/2015 |
| CN | 204441139 | U | 7/2015 |
| CN | 205016398 | U | 2/2016 |
| CN | 205487874 | U | 8/2016 |
| CN | 105118723 | B | 11/2017 |
| CN | 107017870 | B | 8/2018 |
| CN | 108962654 | A | 12/2018 |
| CN | 110047677 | A | 7/2019 |
| CN | 110199369 | A | 9/2019 |
| CN | 110379661 | A | 10/2019 |
| CN | 110444429 | A | 11/2019 |
| CN | 209627348 | U | 11/2019 |
| CN | 106887358 | B | 3/2020 |
| CN | 111180233 | A | 5/2020 |
| CN | 111684559 | A | 9/2020 |
| CN | 108206112 | B | 4/2021 |
| TW | 200534312 | A | 10/2005 |
| TW | 1246701 | | 1/2006 |
| TW | 201611064 | A | 3/2016 |
| TW | I665701 | B | 7/2019 |
| TW | M603617 | U | 11/2020 |
| WO | 2017/181313 | A1 | 10/2017 |
| WO | 2019/052377 | A1 | 3/2019 |

OTHER PUBLICATIONS

Yang, the specification, including the claims, and drawings in the U.S. Appl. No. 18/081,712, filed Dec. 15, 2022.

Yang, the specification, including the claims, and drawings in the U.S. Appl. No. 18/066,412, filed Dec. 15, 2022.

* cited by examiner

KEYSWITCH STRUCTURE AND LIFT MECHANISM THEREOF

CROSS REFERENCE TO RELATED APPLICATIONS

This application claims the benefit of U.S. Provisional Application No. 63/361,375, filed on Dec. 16, 2021. Further, this application claims the benefit of U.S. Provisional Application No. 63/356,558, filed on Jun. 29, 2022. The contents of these applications are incorporated herein by reference.

BACKGROUND OF THE INVENTION

1. Field of the Invention

The present invention relates to a keyswitch structure, and more particularly to a lift mechanism of a keyswitch structure and a keyswitch structure having a key switch.

2. Description of the Prior Art

The architecture of the current mechanical keyswitch is mainly to connect the keycap and the base with a lift mechanism, so that the keycap can move up and down relative to the base. The stability of the keycap movement, including the stroke and smoothness of the movement, usually relies on the lift mechanism. Traditionally, the mechanical keyswitch uses a compression spring disposed upright, and the light source may be disposed directly under the compression spring, which allows light to smoothly pass through the hollow portion of the compression spring to illuminate the light-emitting area of the keyswitch.

SUMMARY OF THE INVENTION

An objective of the invention is to provide a lift mechanism for supporting a keycap in a vertical direction. The lift mechanism includes a first support, a second support, and a spring structure. The first support and the second support are connected to each other and are mutually rotatable. The spring structure is connected to the first support and the second support. The spring structure drives the first support and the second support to lift the keycap in the vertical direction. Therein, the lift mechanism as a whole defines a central space. The central space extends through the whole lift mechanism. The spring structure does not enter the central space. Thereby, the central space allows light emitted by a light-emitting part to pass through to illuminate the keycap without interference from the spring structure.

Another objective of the invention is to provide a lift mechanism for supporting a keycap in a vertical direction. The lift mechanism includes a first support and a second support. The first support has a first protruding portion. The second support has a second protruding portion. The first protruding portion extends below the second support and abuts the second support on a rotation axis. The second protruding portion extends below the first support and abuts the first support on the rotation axis. The first support and the second support are mutually rotatable with respect to the rotation axis. Thereby, by the first protruding portion and the second protruding portion extending under the second support and the first support, respectively, the degree of mutual structural constraint is increased, improving the stability of the first support and the second support abutting against each other.

Another objective of the invention is to provide a keyswitch structure. The keyswitch structure includes a base, a keycap, a lift mechanism, and a switch. The keycap is disposed above the base in a vertical direction. The lift mechanism is connected to and between the base and the keycap. The keycap is movable relative to the base in the vertical direction through the lift mechanism. The switch includes a mount, a resilient part, a first switch contact, a second switch contact, and an intermediate support. The mount is fixed on the base. The resilient part is partially fixed on the mount. The resilient part produces a restoring force. The first switch contact is fixed on the mount. The second switch contact is fixed on the resilient part opposite to the first switch contact. The intermediate support is pivotally connected to the mount. The resilient part detachably abuts downward against the intermediate support. The intermediate support detachably abuts downward against the lift mechanism or the keycap. Therein, the restoring force drives the second switch contact to move toward the first switch contact, drives the resilient part to abut downward against the intermediate support, and drives the intermediate support to abut downward against the lift mechanism or the keycap through the resilient part. Besides, when the keycap is pressed downward to a pressed position, the second switch contact contacts the first switch contact, the resilient part is separated from the intermediate support, and the intermediate support is separated from the lift mechanism or the keycap. Thereby, after the first switch contact contacts the second switch contact, subsequent downward movement of the keycap will not change the contact force between the first switch contact and the second switch contact, avoiding or greatly reducing the wear of the first switch contact and the second switch contact, so the stability of the contact between the first switch contact and the second switch contact can be increased and the service life of the switch can be prolonged.

These and other objectives of the present invention will no doubt become obvious to those of ordinary skill in the art after reading the following detailed description of the preferred embodiment that is illustrated in the various figures and drawings.

DETAILED DESCRIPTION

In order to design an ultra-low profile keyswitch with significant tactile feedback, the inventors conducted in-depth problem analysis and attempts. For example, the lift mechanism of the keyswitch can be a dual-support mechanism in the form of scissors, butterfly (upright V-shaped configuration) or bat (inverted V-shaped configuration), which also cooperates with a horizontal spring with low overall height that connects the two supports and produces a restoring force to lift the keycap. If the force at the corners of the keyswitch during the lifting and lowering of the keycap without swaying also needs to be balanced, the spring must be set in the central space so that the supports are evenly stressed. However, the inventors found that in such a structural configuration, the space under the keycap would be roughly vertically divided into two portions by the spring, so that it is not easy to dispose a light-emitting part of an illuminated keyswitch structure in the center to directly illuminate the large main light-emitting area of the keycap, or it is difficult for the light to reach some corners of the keycap, which affects the backlight uniformity. Furthermore, in a general keyswitch structure with plastic supports, the supports are usually pivotally connected to each other by a hole-shaft structure; however, the hole-shaft structure occupies a certain space, which makes it difficult to reduce the thickness of the supports, which is not conducive to low-profile designs. In addition, if the switch of the keyswitch uses resilient sheets, the problem that needs to be faced is that after the contacts of the switch touch each other, the contact force between the contacts will still increase as the keycap moves down, and the contacts will also continue rubbing against each other, causing wear and shortening the service life.

Figure 1:
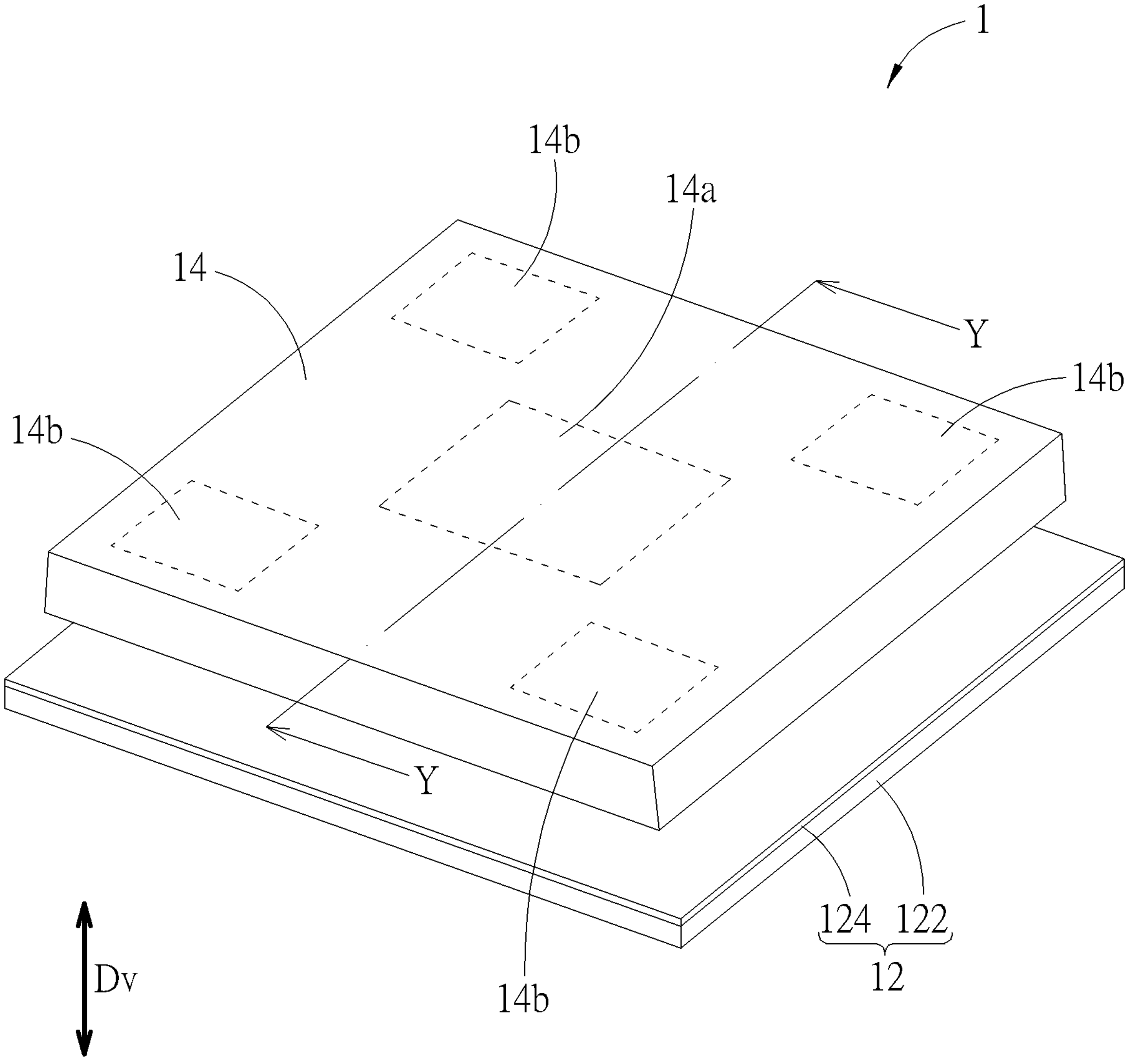
FIG. 1 is a schematic diagram illustrating a keyswitch structure according to an embodiment.
Figure 2:
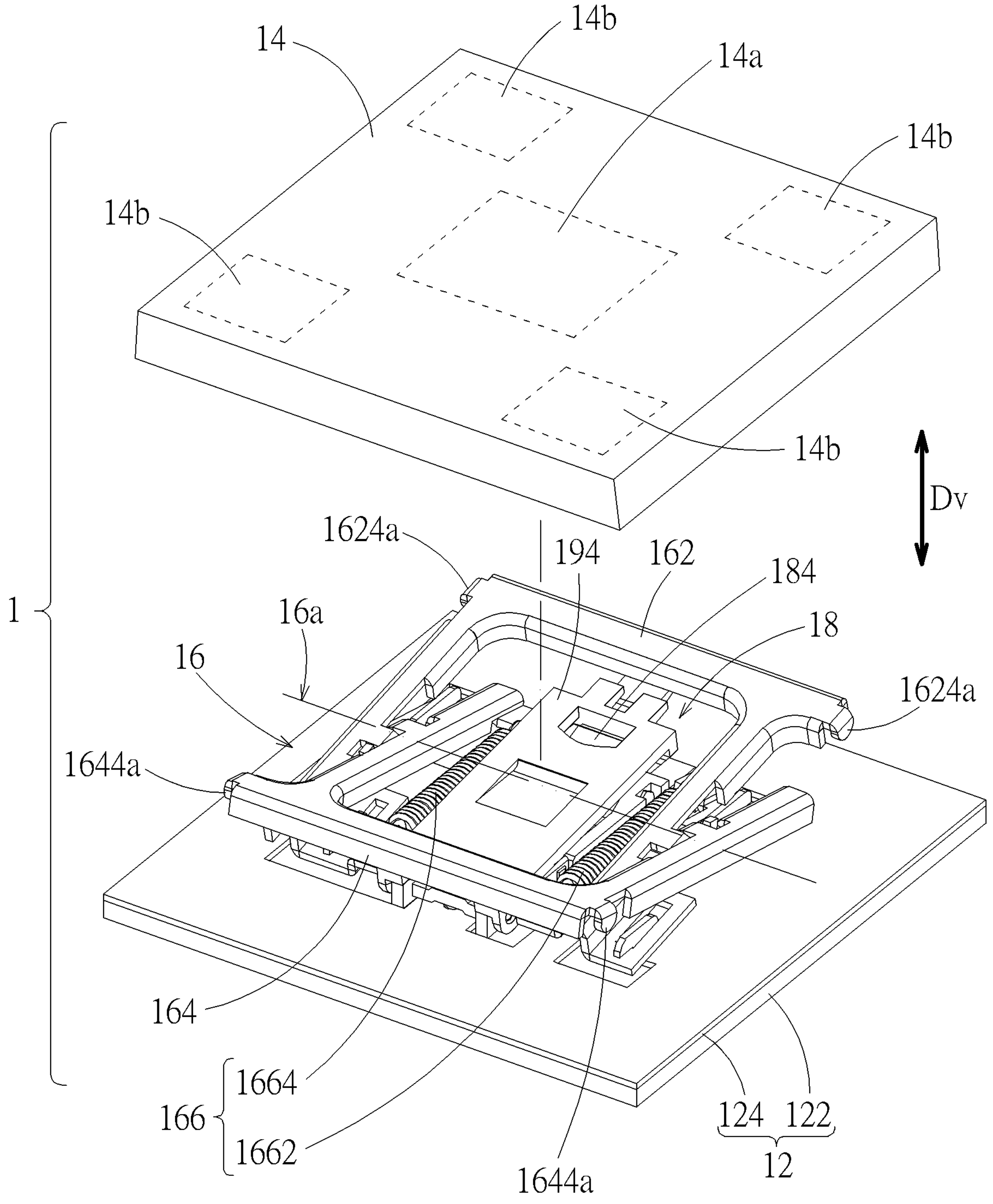
FIG. 2 is a partially exploded view of the keyswitch structure in FIG. 1.
Figure 3:
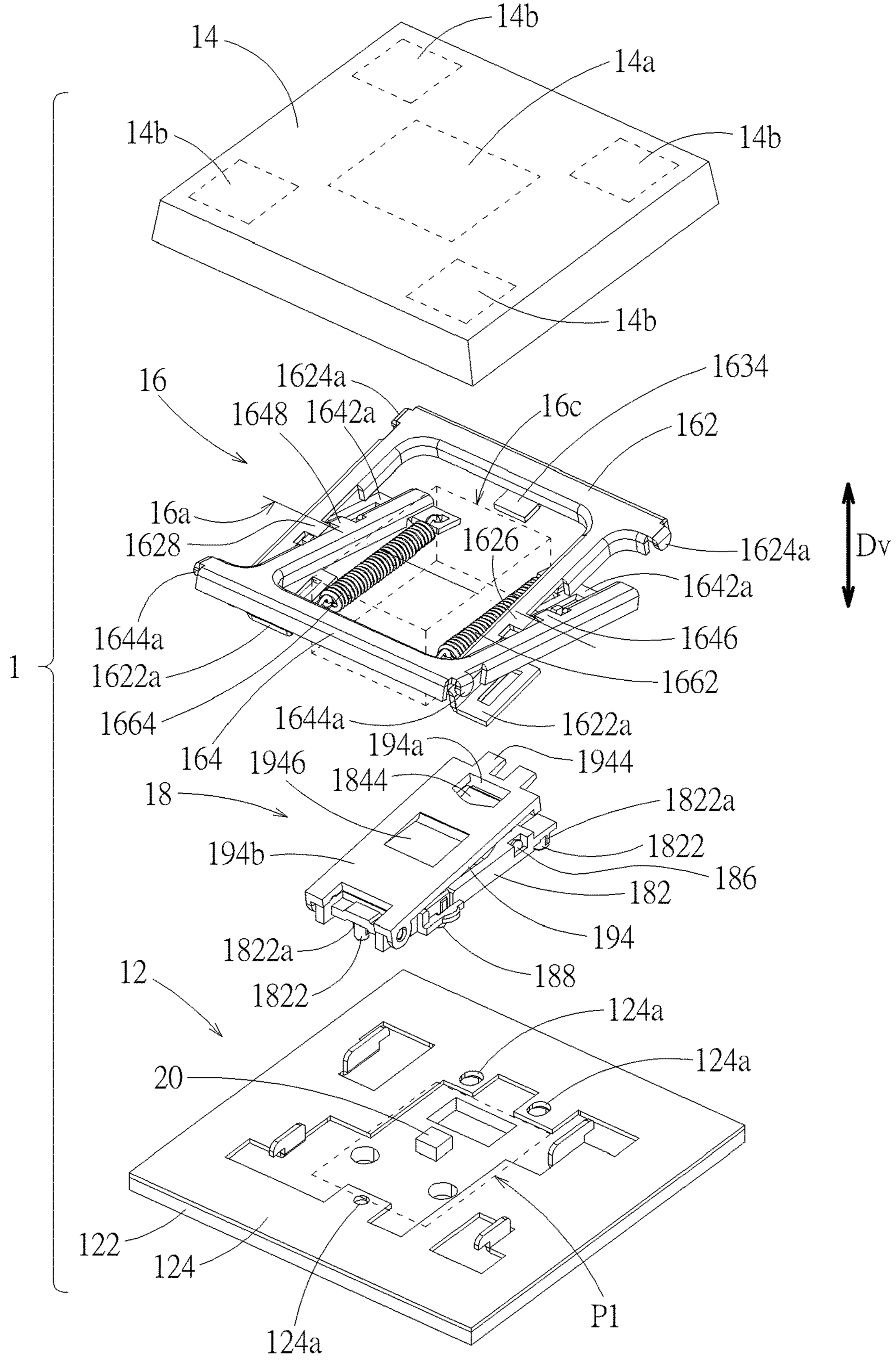
FIG. 3 is another partially exploded view of the keyswitch structure in FIG. 1.

Please refer to FIG. 1 to FIG. 3. A keyswitch structure 1 according to an embodiment includes a base 12, a keycap 14, a lift mechanism 16, and a switch 18. The keycap 14 is disposed above the base 12 in a vertical direction Dv (indicated by a dual-head arrow in the figures). The lift mechanism 16 is connected to and between the base 12 and the keycap 14, so that the keycap 14 can move relative to the base 12 in the vertical direction Dv through the lift mechanism 16. The switch 18 is fixed on the base 12. The keycap 14 can move toward the base 12 to make the switch 18 be triggered. Therein, the lift mechanism 16 includes a first support 162, a second support 164, and a spring structure 166. The first support 162 and the second support 164 are connected to and between the base 12 and the keycap 14 and can rotate relative to each other, so as to support the keycap 14, so that the keycap 14 can move relative to the base 12 in the vertical direction Dv through the first support 162 and the second support 164. The spring structure 166 is connected to the first support 162 and the second support 164 to provide a resilience force to the first support 162 and the second support 164. The restoring force can drive the first support 162 and the second support 164 to lift the keycap 14 in the vertical direction Dv.

In the embodiment, as shown by FIG. 2 and FIG. 3, the first support 162 and the second support 164 are connected to each other, so that the first support 162 and the second support 164 can mutually rotate with respect to a rotation axis **16*a* (indicated by a chain line in the figures). Please refer to FIG. 4. The first support 162 has a first base connecting portion 1622 and a first keycap connecting portion 1624. The first support 162 is connected to the base 12 through the first base connecting portion 1622 and is connected to the keycap 14 through the first keycap connecting portion 1624. In the embodiment, the first support 162 as a whole is roughly an n-shaped structure (which includes two side arm portions 1620*a* and a transverse connecting portion 1620*b* connecting the two side arm portions 1620*a*). The first base connecting portion 1622 includes two connecting structures 1622*a* on end portions of the two side arm portions 1620*a*, respectively. The first keycap connecting portion 1624 includes two connecting structures 1624*a* on two end portions of the transverse connecting portion 1620*b*, respectively. Furthermore, the first support 162 also has a first protruding portion 1626 and a third protruding portion 1628 on the middle portions of the two side arm portion 1620*a***, respectively.

Figure 5:
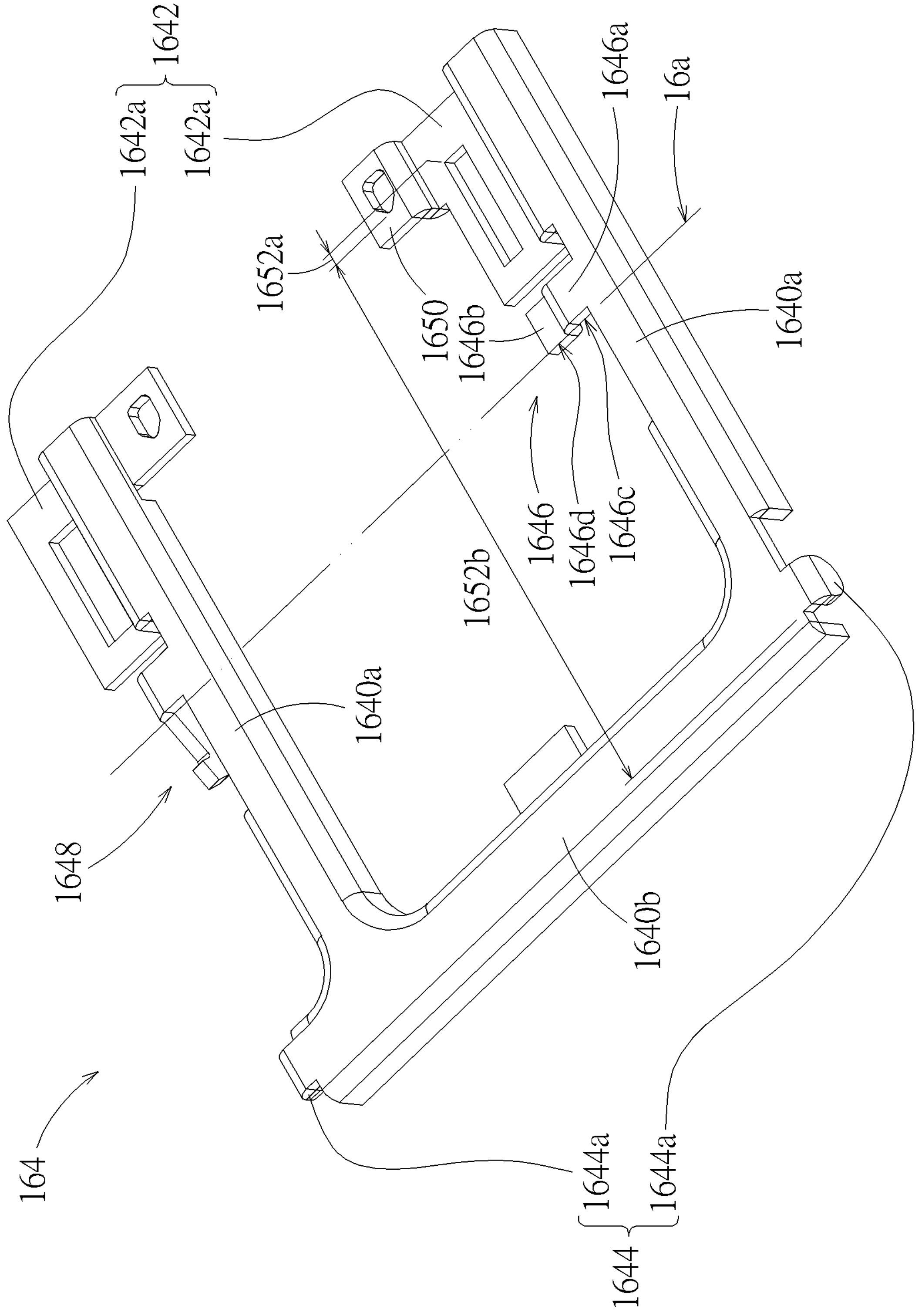
FIG. 5 is a schematic diagram illustrating a second support of the lift mechanism in FIG. 3.

Please refer to FIG. 5. The second support 164 has a second base connecting portion 1642 and a second keycap connecting portion 1644. The second support 164 is connected to the base 12 through the second base connecting portion 1642 and is connected to the keycap 14 through the second keycap connecting portion 1644. In the embodiment, the second support 164 as a whole is roughly an n-shaped structure (which includes two side arm portions **1640*a* and a transverse connecting portion 1640*b* connecting the two side arm portions 1640*a*). The second base connecting portion 1642 includes two connecting structures 1642*a* on end portions of the two side arm portion 1640*a*, respectively. The second keycap connecting portion 1644 includes two connecting structures 1644*a* on two end portions of the transverse connecting portion 1640*b*, respectively. Furthermore, the second support 164 also has a second protruding portion 1646 and a fourth protruding portion 1648 on the middle portions of the two side arm portion 1640*a***, respectively.

Figure 4:
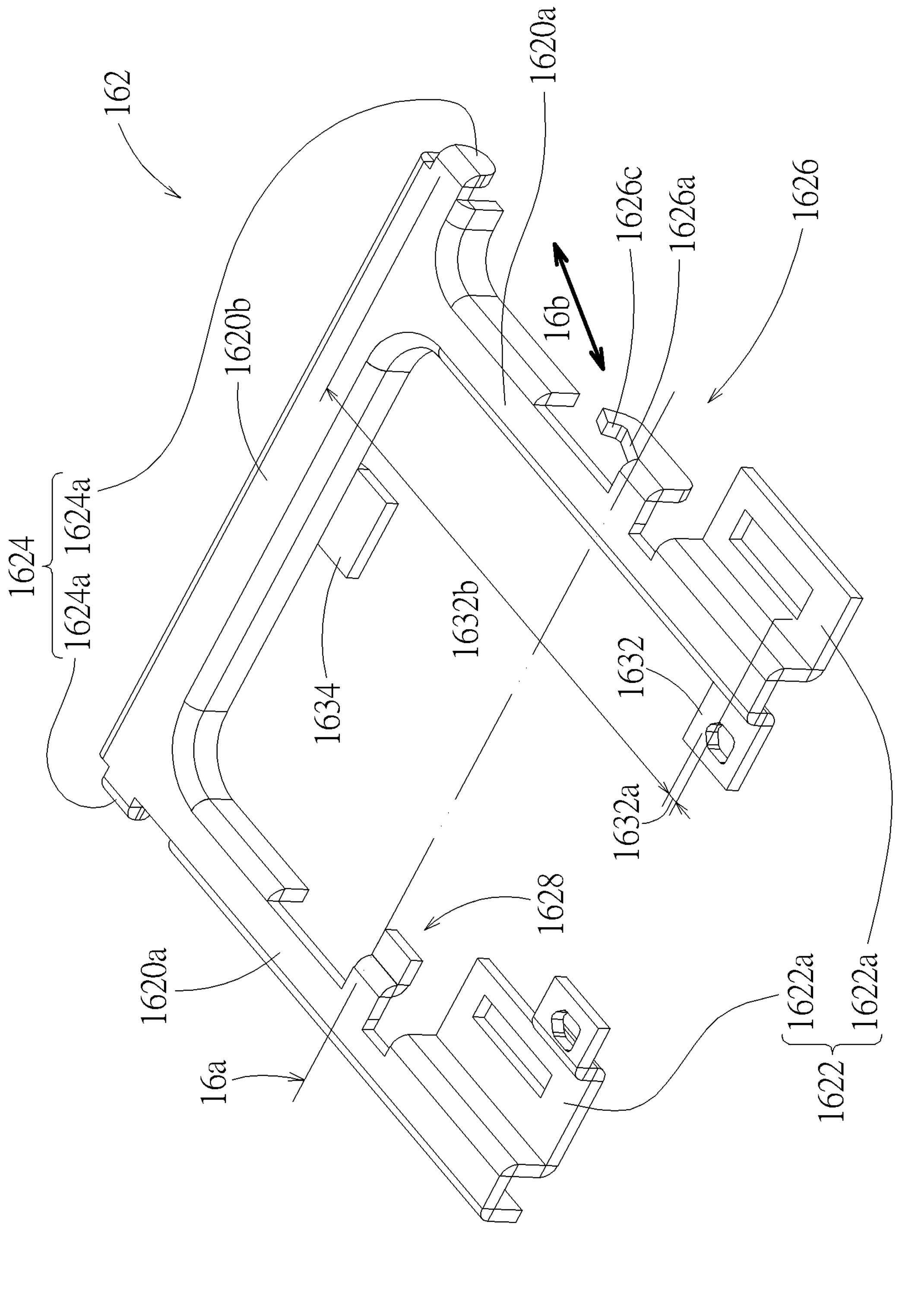
FIG. 4 is a schematic diagram illustrating a first support of a lift mechanism in FIG. 3.

As shown by FIG. 2 and FIG. 4, the first protruding portion 1626 and the third protruding portion 1628 of the first support 162 extend below the second support 164 and abut against the second support 164 on the rotation axis **16*a*. The second protruding portion 1646 and the fourth protruding portion 1648 of the second support 164 extends below the first support 162 and abuts against the first support 162 on the rotation axis 16***a*. Thereby, the first support 162 and the second support 164 as a whole is an X-shaped supporting structure. The first support 162 and the second support 164 can be mutually driven and constrained in structure.

Figure 6:
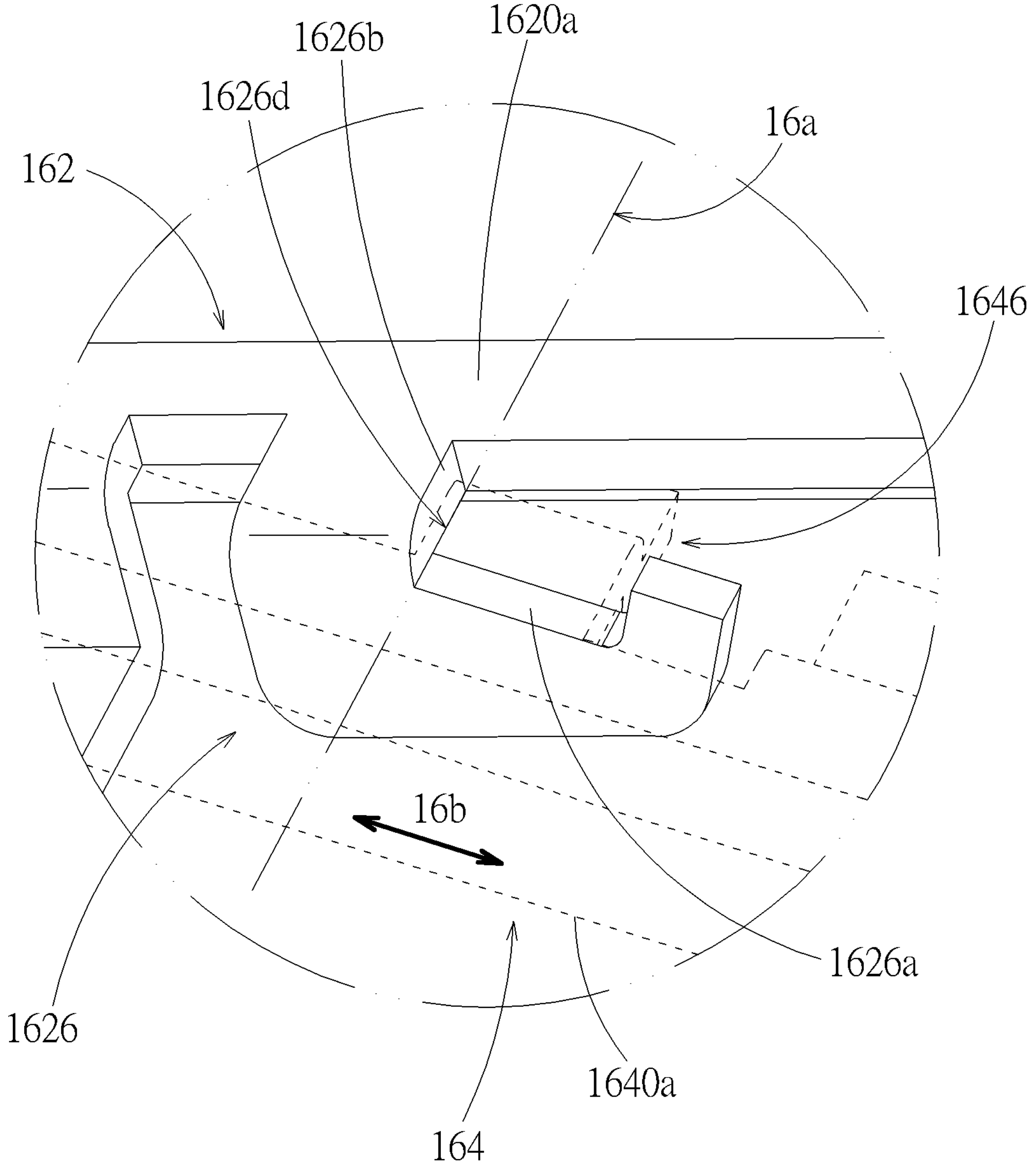
FIG. 6 is a schematic diagram illustrating that a portion of the first support of the lift mechanism in FIG. 3 corresponding to a first protruding portion thereof extends under the second support; therein, the profile of the second support is shown in dashed lines, and the view point of FIG. 6 is different from that of FIG. 3.
Figure 7:
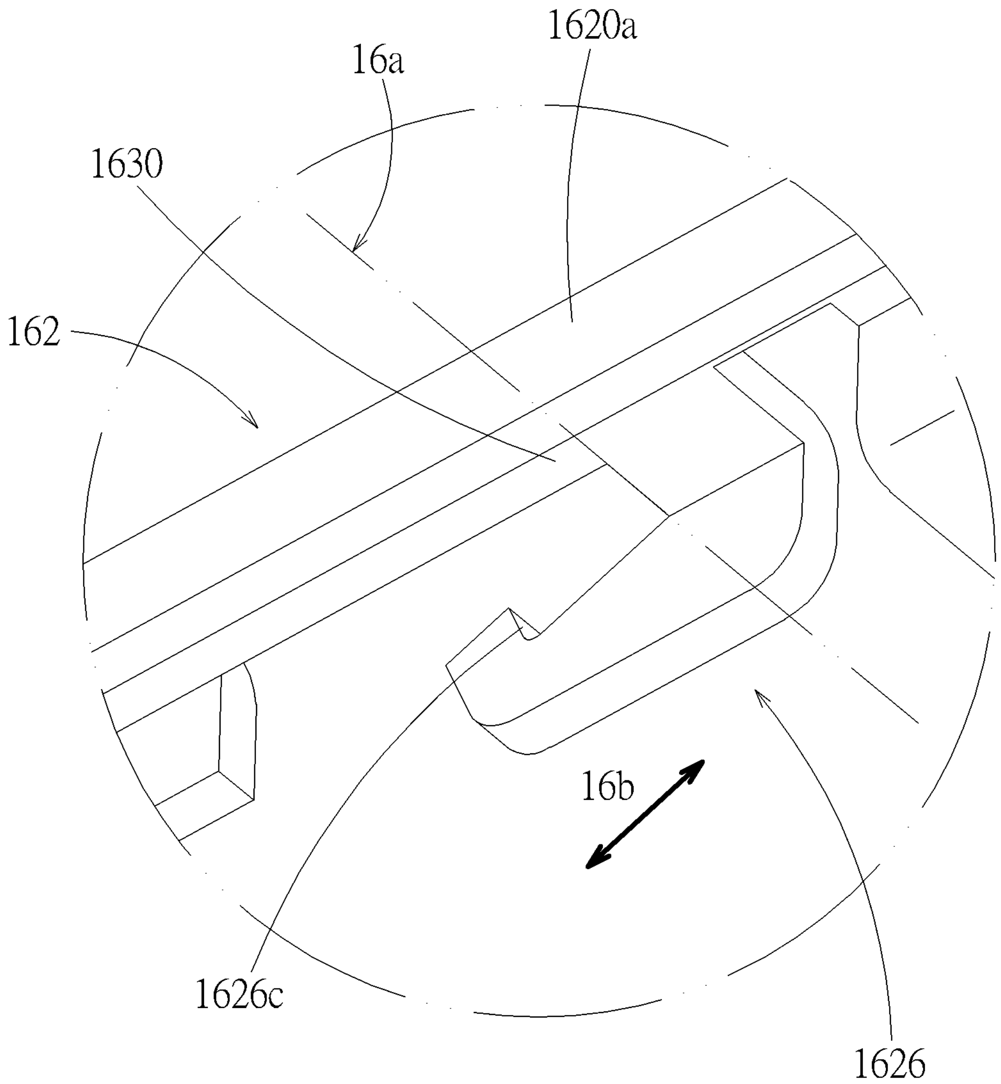
FIG. 7 is a schematic diagram illustrating the first support in FIG. 6 in another view point.

For further details, please refer to FIG. 4, FIG. 6 and FIG. 7. The first protruding portion 1626 as a whole roughly presents an L-shaped structure (from the top view), which protrudes parallel to the rotation axis 16*a* from the body of first support 162 and then extends perpendicular to the rotation axis 16*a*. The first protruding portion 1626 has an upper surface 1626*a*, a side surface 1626*b*, and a constraint surface 1626*c*. The rotation axis 16*a* lies on both the upper surface 1626*a* and the side surface 1626*b*. The upper surface 1626*a* and the side surface 1626*b* are connected to form a connecting edge 1626*d* that coincides with the rotation axis 16*a*. The constraint surface 1626*c* faces the side surface 1626*b* in a radial direction 16*b* (indicated by a dual-head arrow in the figures) perpendicular to the rotation axis 16*a*. The first support 162 has a bottom surface 1630. The rotation axis 16*a* also lies on the bottom surface 1630. Moreover, please refer to FIG. 5, FIG. 8 and FIG. 9. The second protruding portion 1646 as a whole protrudes parallel to the rotation axis 16*a* from the body of the second support 164 to from a stepped structure (which includes a first structural segment 1646*a* and a second structural segment 1646*b* in a the rotation axis 16*a*). The second protruding portion 1646 has a first edge 1646*c* and a second edge 1646*d* which are located on the first structural segment 1646*a* and the second structural segment 1646*b*, respectively, and coincide with the rotation axis 16*a*.

Figure 8:
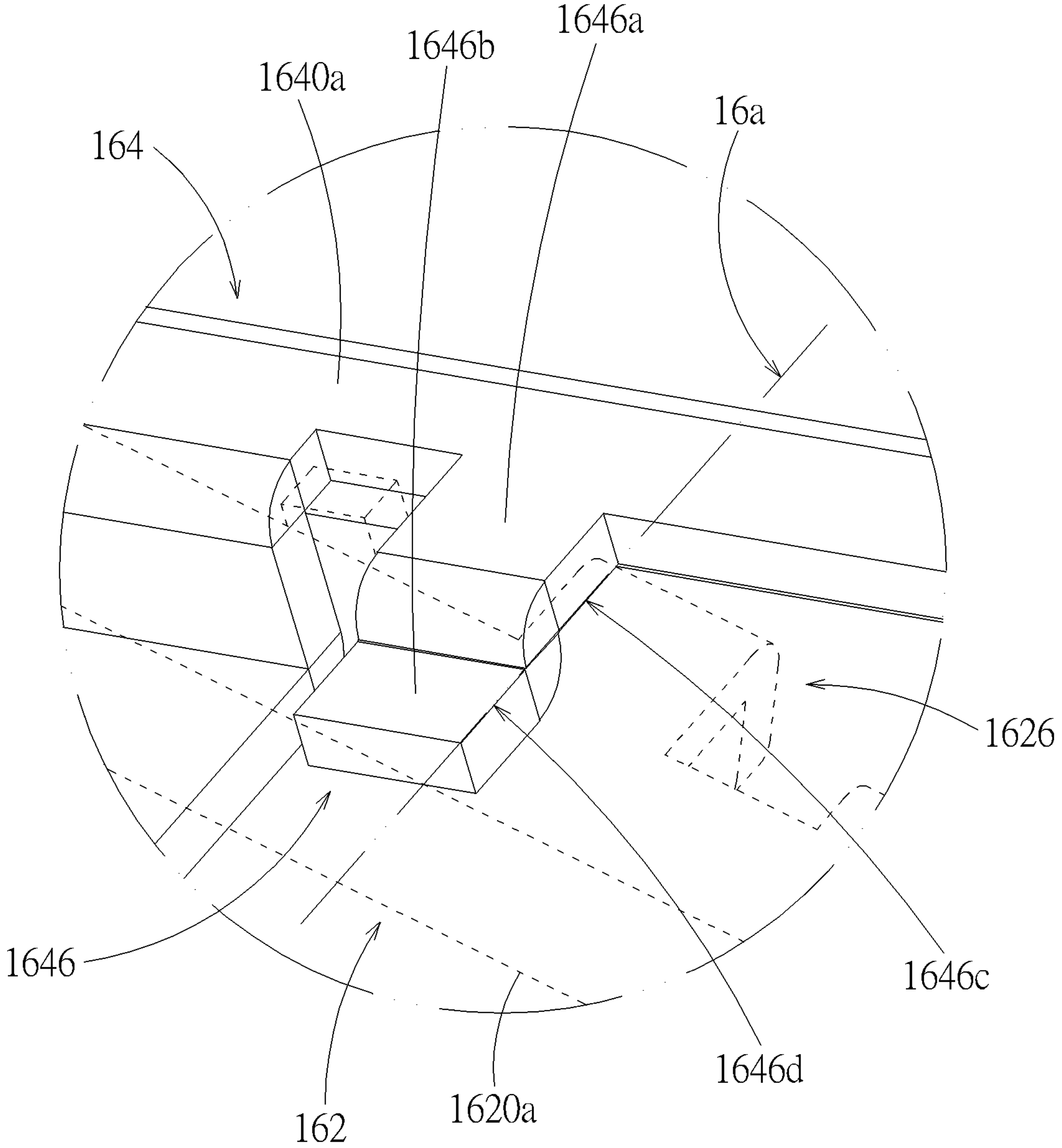
FIG. 8 is a schematic diagram illustrating that a portion of the second support of the lift mechanism in FIG. 3 corresponding to a second protruding portion thereof extends under the first support; therein, the profile of the first support is shown in dashed lines, and the view point of FIG. 8 is different from that of FIG. 3.
Figure 9:
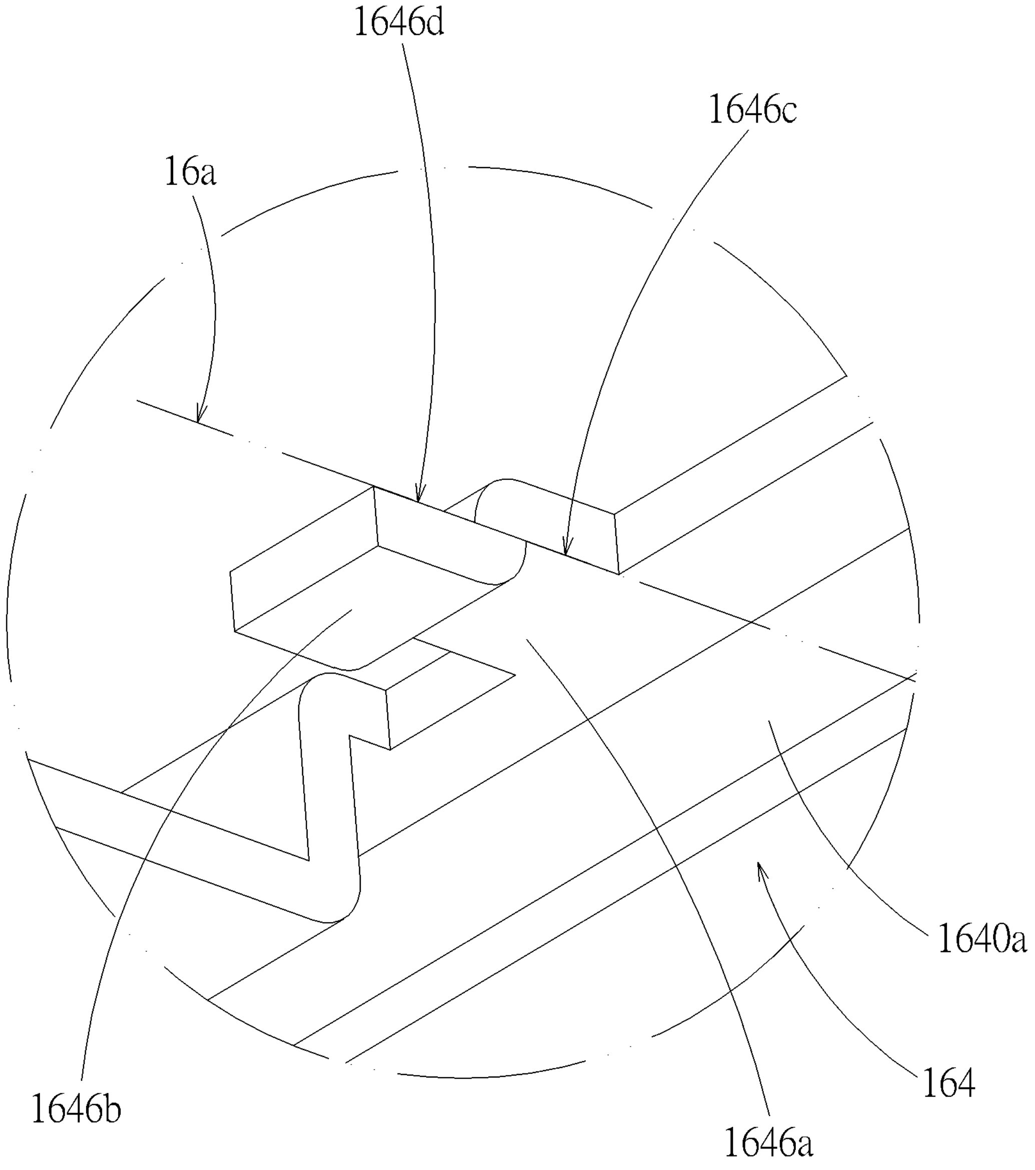
FIG. 9 is a schematic diagram illustrating the second support in FIG. 8 in another view point.

Please refer to FIG. 3, FIG. 6 and FIG. 8. The first structural segment 1646*a* of the second protruding portion 1646 is above the upper surface 1626*a* of the first protruding portion 1626 and between the side surface 1626*b* and the constraint surface 1626*c* of the first protruding portion 1626. The second structural segment 1646*b* of the second protruding portion 1646 extends below the side arm portion 1620*a* of the first support 162. Therein, the first edge 1646*c* abuts against the connecting edge 1626*d* of the first protruding portion 1626 (i.e., logically, against the upper surface 1626*a* and the side surface 1626*b* at the same time). The second edge 1646*d* abuts against the bottom surface 1630 of the first support 162 (or the side arm portion 1620*a* thereof). Both the first edge 1646*c* and the second edge 1646*d* abut against the first support 162 in a line-contact manner; therefore, the portions of the first support 162 and the second support 164 shown in FIG. 6 and FIG. 8 are connected on the rotation axis 16*a* by line contact, so that the first support 162 and the second support 164 can mutually rotate with respect to the rotation axis 16*a*. Furthermore, the first protruding portion 1626 is continuously bent to make two surfaces of the first protruding portion 1626 spaced opposite each other. The two surfaces include the side surface 1626*b* and the constraint surface 1626*c*, and can jointly structurally constrain the second structural segment 1646*b* of the second protruding portion 1646 in the radial direction 16*b*, preventing the second protruding portion 1646 from being separated from the first support 162 (or the first protruding portion 1626 thereof) in the radial direction 16*b*. The upper surface 1626*a* of the first protruding portion 1626 and the bottom surface 1630 of the side arm portion 1620*a* also can jointly structurally constrain the second protruding portion 1646, preventing the second protruding portion 1646 from being separated from the first support 162 in a direction perpendicular to the rotation axis 16*a* (e.g. a direction that is non-parallel to both the upper surface 1626*a* and the bottom surface 1630). In the action of the lift mechanism 16, the structural constraint of the upper surface 1626*a* of the first protruding portion 1626 on the second protruding portion 1646 (or the first structural segment 1646*a* thereof) also can limit the height of the keycap 14 lifted by the lift mechanism 16. Moreover, the stepped structure of the second protruding portion 1646 also can form mutual structural constraints with the first support 162 (including the body thereof and the first protruding portion 1626) in a direction parallel to the rotation axis 16*a*, which can prevent the first support 162 and the second support 164 from being separated from each other in this direction.

Please refer to FIG. 3 to FIG. 5. In the embodiment, the third protruding portion 1628 of the first support 162 and the second protruding portion 1646 of the second support 164 have the same structure. The fourth protruding portion 1648 of the second support 164 and the first protruding portion 1626 of the first support 162 have the same structure. Hence, the connection relationship between the first support 162 and the second support 164 by the third protruding portion 1628 and the fourth protruding portion 1648 is same as the connection relationship between the first support 162 and the second support 164 by the first protruding portion 1626 and the second protruding portion 1646, which will not be described in addition. However, it is not limited thereto in practice. For example, both sides of the first support 162 are connected to the second support 164 (which has the structure of the second protruding portion 1646 on both sides) by the structure of the first protruding portion 1626. For another example, the third protruding portion 1628 of the first support 162 is replaced with other connecting structure to connect with the second support 164 (of which the fourth protruding portion 1648 is structurally modified accordingly), which will not be described in addition. Furthermore, in the embodiment, the first support 162 and the second support 164 have the same structure, which helps reduce the number of parts and manufacturing costs. Furthermore, the first support 162 and the second support 164 can be formed by stamping a metal plate, which can take into account the thinning and structural strength of the supports. However, it is not limited thereto in practice. Furthermore, in the embodiment, the position where the first support 162 and the second support 164 are connected is between the first/second base connecting portion 1622/1642 and the first/second keycap connecting portion 1624/1644; however, it is not limited thereto in practice. For example, the first/second base connecting portion 1622/1642 is disposed on the middle portion of the side arm portion of the n-shaped structure, and the first/second protruding portion 1626/1646 is disposed on the end portion of the side arm portion of the n-shaped structure. In addition, in the embodiment, the first support 162 and the second support 164 are connected on both sides of the n-shaped structure; however, it is not limited to thereto in practice. For example, the first support 162 and the second support 164 are connected only on one side of their n-shaped structure. In addition, compared with the supports that are generally pivotally connected to each other by a hole-shaft structure, the first support 162 and the second support 164 use the protruding portions 1626 and 1628 and the protruding portions 1646 and 1648 to extend below each other so as to be mutually driven and constrained in structure. This structural configuration can achieve the mutual pivotal connection between the supports 162 and 164. Furthermore, since the connection structure between the first support 162 and the second support 164 has no hole-shaft structure, the thickness of the support can be significantly reduced compared with the hole-shaft structure, which is conducive to low-profile designs.

Figure 10:
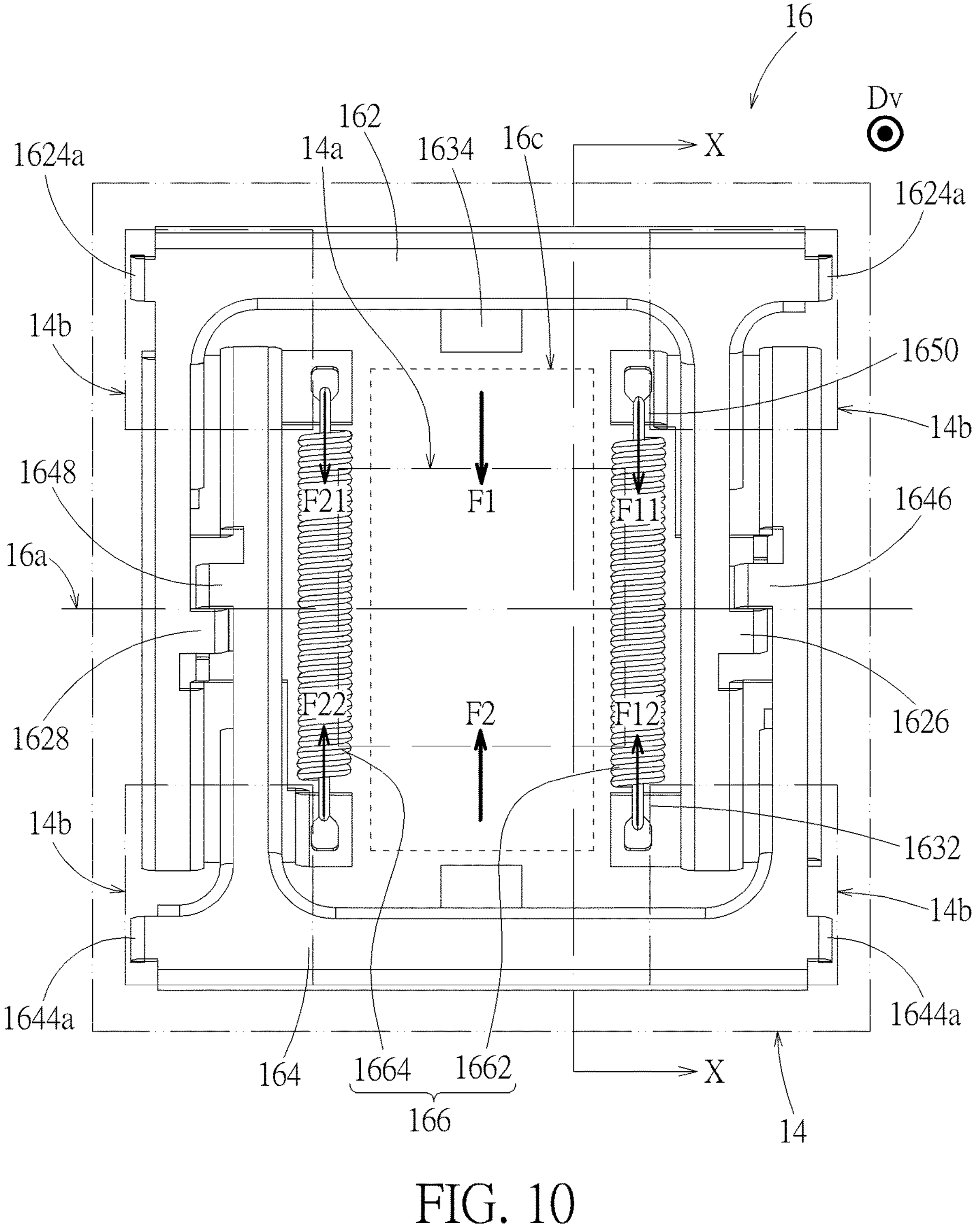
FIG. 10 is a top view of the lift mechanism in FIG. 3; therein, the profile of the keycap and the corresponding locations of light-emitting areas defined on the keycap are shown in chain lines.

Please refer to FIG. 3 and FIG. 10. In the embodiment, the lift mechanism 16 as a whole defines a central space 16*c* (indicated by a dashed box in FIG. 3 and FIG. 10), which extends through the whole lift mechanism 16 in the vertical direction Dv. The spring structure 166 includes a first spring portion 1662 and a second spring portion 1664, which are located on two opposite sides of the central space 16*c* and connected to the first support 162 and the second support 164. From the view point of FIG. 10, the first spring portion 1662 extends parallel to and adjacent to the projection of one of the side arm portion 1620*a* of the first support 162; the second spring portion 1664 extends parallel to and adjacent to the projection of one of the side arm portion 1640*a* of the second support 164. The first spring portion 1662 and the second spring portion 1664 may be realized by, but not limited to, helical springs, which are connected to the first support 162 and the second support 164 in tension. The first spring portion 1662 and the second spring portion 1664 will drive the first support 162 and the second support 164 to approach each other in the horizontal direction (perpendicular to the vertical direction Dv), thereby lifting the keycap 14.

As shown by FIG. 10, the force F11 (indicated by an arrow in the figure) exerted by the first spring portion 1662 on the first support 162 is the same in magnitude as and opposite in direction to the force F12 (indicated by an arrow in the figure) exerted by the first spring portion 1662 on the second support 164; the force F21 (indicated by an arrow in the figure) exerted by the second spring portion 1664 on the first support 162 is the same in magnitude as and opposite in direction to the force F22 (indicated by an arrow in the figure) exerted by the second spring portion 1664 on the second support 164. The equivalent force F1 (indicated by an arrow in the figure) of the force (including the force F11 and the force F21) exerted by the spring structure 166 on the first support 162 passes through the central space 16*c*, which helps to reduce or eliminate the possibility of the rotation of the first support 162 relative to the vertical direction Dv due to the force exerted by the spring structure 166. Similarly, the equivalent force F2 (indicated by an arrow in the figure) of the force (including the force F12 and the force F22) exerted by the spring structure 166 on the second support 164 passes through the central space 16*c*, which helps to reduce or eliminate the possibility of the rotation of the second support 164 relative to the vertical direction Dv due to the force exerted by the spring structure 166. The above force relationships can be achieved by, for example, but not limited to, the first spring portion 1662 and the second spring portion 1664 being implemented with identical springs arranged symmetrically with respect to the central space 16*c*. On the other hand, that the equivalent forces F1 and F2 pass through the central space 16*c* helps to make the force on the first support 162 and the second support 164 (including the force against each other between the supports) uniform, which is conducive to the structural stability of the lift mechanism 16.

Figure 11:
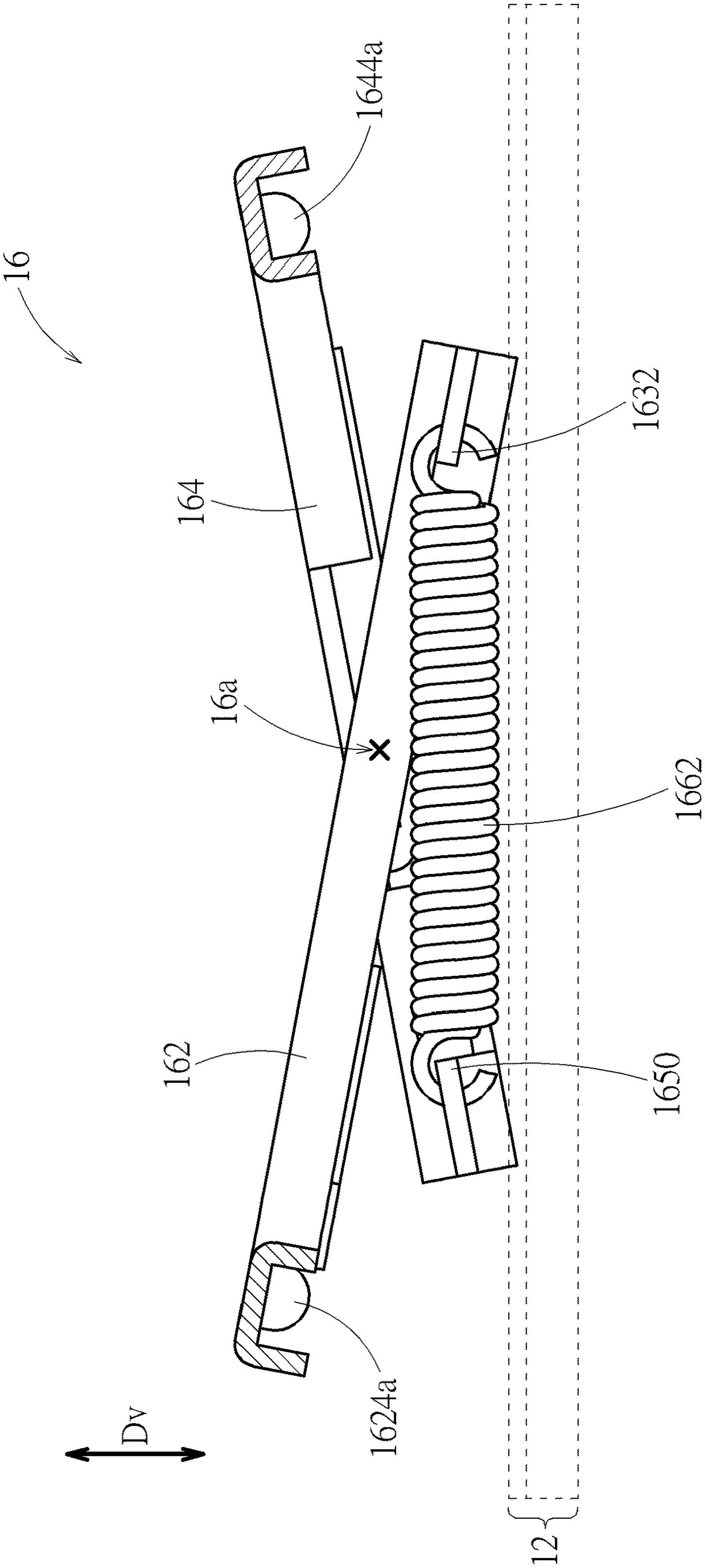
FIG. 11 is a sectional view of the lift mechanism along the line X-X in FIG. 10; therein, the profile of the base is shown in dashed lines.

Please refer to FIG. 3 and FIG. 11; therein, the location of the rotation axis 16*a* in FIG. 11 is indicated by a cross mark. In the embodiment, the first spring portion 1662 is connected to the first support 162 and the second support 164 near the base 12, so that when the first support 162 and the second support 164 rotate with respect to the rotation axis 16*a* (the keycap 14 is lifted and lowered accordingly), the first spring portion 1662 is extended and restored roughly at a fixed position in the vertical direction Dv, or the positional change in vertical direction Dv when the first spring portion 1662 is extended and restored can be significantly reduced (compared to the cases where the first spring portion 1662 is connected to other portions of the first/second support 162/164). Please refer to FIG. 3 and FIG. 4. There is a distance 1632*a* between a portion 1632 of the first support 162 connecting with the first spring portion 1662 and the connecting structure 1622*a* of the first base connecting portion 1622 (in the direction in which the side arm portions of the first support 162 extend). There is a distance 1632*b* between the portion 1632 and the connecting structure 1624*a* of the first keycap connecting portion 1624 (in the direction in which the side arm portions of the first support 162 extend).

Please refer to FIG. 3 and FIG. 5. There is a distance 1652*a* between a portion 1650 of the second support 164 connecting with the first spring portion 1662 and the connecting structure 1642*a* of the second base connecting portion 1642 (in the direction in which the side arm portions of the second support 164 extend). There is a distance 1652*b* between the portion 1650 and the connecting structure 1644*a* of the second keycap connecting portion 1644 (in the direction in which the side arm portions of the second support 164 extend). In principle, the distance 1632*a* is less than the distance 1632*b*, and the distance 1652*a* is less than the distance 1652*b*. Thereby, since the first spring portion 1662 is extended and restored due to the rotation of the first support 162 and the second support 164 with respect to the rotation axis 16*a*, the position of the first spring portion 1662 in the vertical direction Dv will change within a range of variation. Furthermore, in the embodiment, the distance 1632*a* and the distance 1652*a* are relatively small, so that the vertical position of the first spring portion 1662 can be regarded as being constant during its extension and restoration. This structural configuration helps to reduce the space required for the first spring portion 1662 to act, and reduce the possibility of the first spring portion 1662 interfering with other structures, and is also conducive to the stability of the first spring portion 1662 during its extension and restoration. Furthermore, the foregoing description about the connection of the first spring portion 1662 with the first support 162 and the second support 164 is also applicable to the connection of the second spring portion 1664 with the first support 162 and the second support 164, which will not be described in addition.

Furthermore, as shown by FIG. 3 and FIG. 10, the spring structure 166 does not enter the central space 16*c*, but the equivalent forces (including the equivalent force F1 and the equivalent force F2) of the restoring force provided by the spring structure 166 to the first support 162 and the second support 164 can pass through the central space 16*c*, which is conducive to the stability of the movement of the first support 162 and the second support 164. In the lift mechanism 16, the first support 162, the second support 164, and the spring structure 166 will never enter the central space 16*c* during the action of the lift mechanism 16, so the central space 16*c* is the open space provided by the lift mechanism 16 in the vertical direction Dv. The central space 16*c* can be used by other components of the keyswitch structure 1 (for example, for accommodating the switch 18 or preventing the upward traveling light from being structurally disturbed by the lift mechanism 16), and is also conducive to designs of low-profile keyswitch. In the keyswitch structure that generally uses an elastic dome to provide the restoring force to the supports thereof, the elastic dome is disposed at the central position, so that if the backlight travels upward from the bottom of the elastic dome, it will be disturbed by the elastic dome, which will affect the backlight effect to the keycap. On the contrary, in the embodiment, the central space 16*c* of the lift mechanism 16 allow light-emitting parts to be disposed corresponding to the central space 16*c*, which can easily provide the symmetrical backlight effect to the keycap 14.

Please refer to FIG. 1 to FIG. 3, and FIG. 10. The keycap 14 thereon defines a plurality of light-emitting areas (shown in dashed lines in FIG. 1 to FIG. 3), including a main light-emitting area 14*a* and four corner light-emitting areas 14*b* which are arranged at the central area and corner areas of the keycap 14, respectively. In FIG. 10, the profile of the keycap 14 and the locations corresponding to the light-emitting areas 14*a* and 14*b* are shown in chain lines. As shown by FIG. 10 (from the view point of FIG. 10), the main light-emitting area 14*a* mostly overlaps with the central space 16*c* of the lift mechanism 16, and the main light-emitting area 14*a* is located between the first spring portion 1662 and the second spring portion 1664. The corner light-emitting areas 14*b* do not overlap with the central space 16*c*, and the corner light-emitting areas 14*b* partially overlap with the first support 162 and the second support 164. In actual products, the keycap 14 is not necessarily provided with light-transmitting structures (such as but not limited to light-transmitting characters) on the light-emitting areas 14*a* and 14*b*. When the light source providing the backlight is disposed on the base 12 corresponding to the central space 16*c*, during the operation of the keyswitch structure 1, no matter whether the keycap 14 is pressed down or not, the light emitted by the light source can directly illuminate the main light-emitting area 14*a*. When the keycap 14 is not pressed, the light emitted by the light source can also illuminate the corner light-emitting areas 14*b*, which provides an indication effect to the user at least when the keycap 14 is not pressed.

Figure 12:
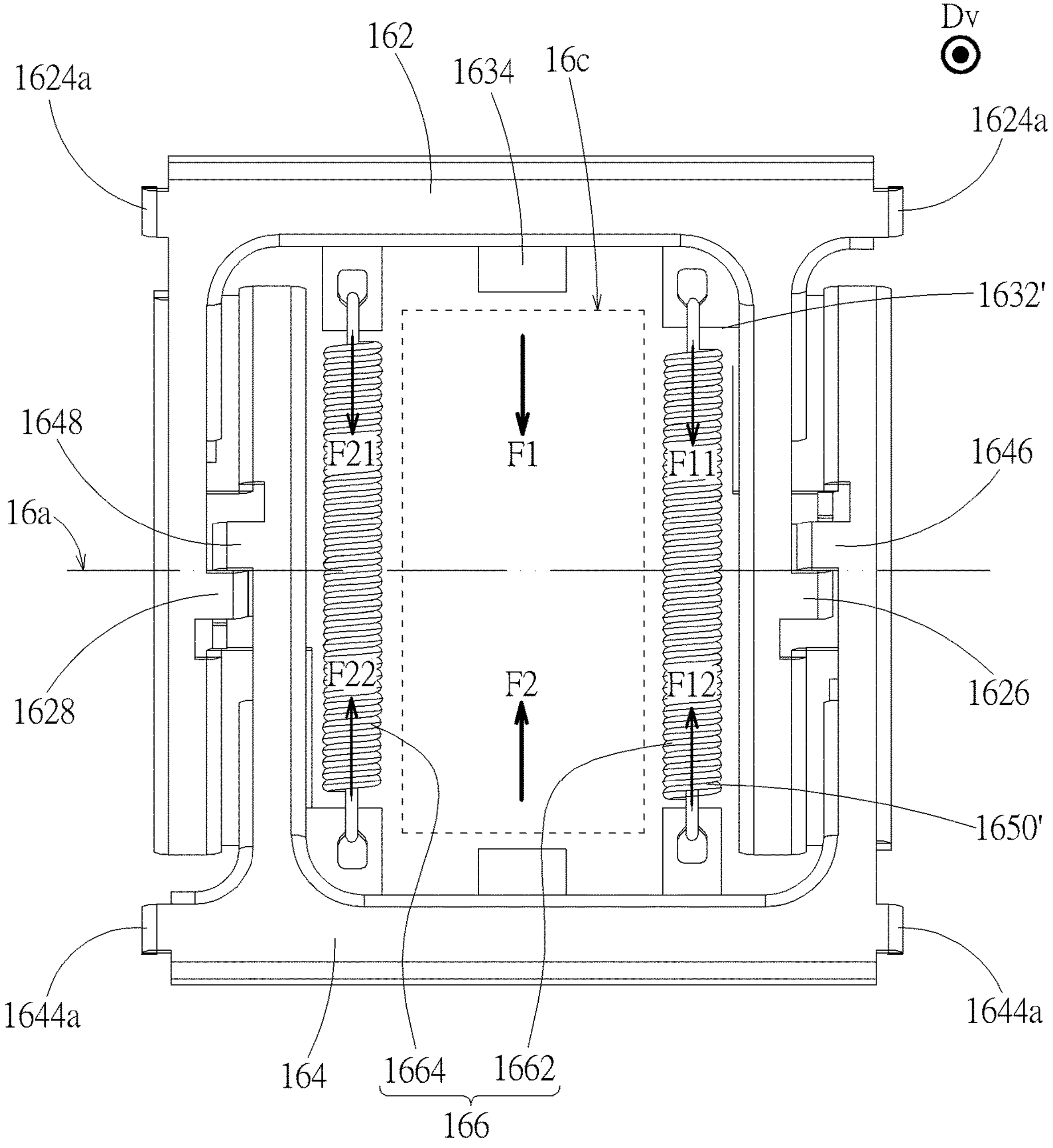
FIG. 12 is a top view of the lift mechanism in FIG. 10 according to a variation.
Figure 13:
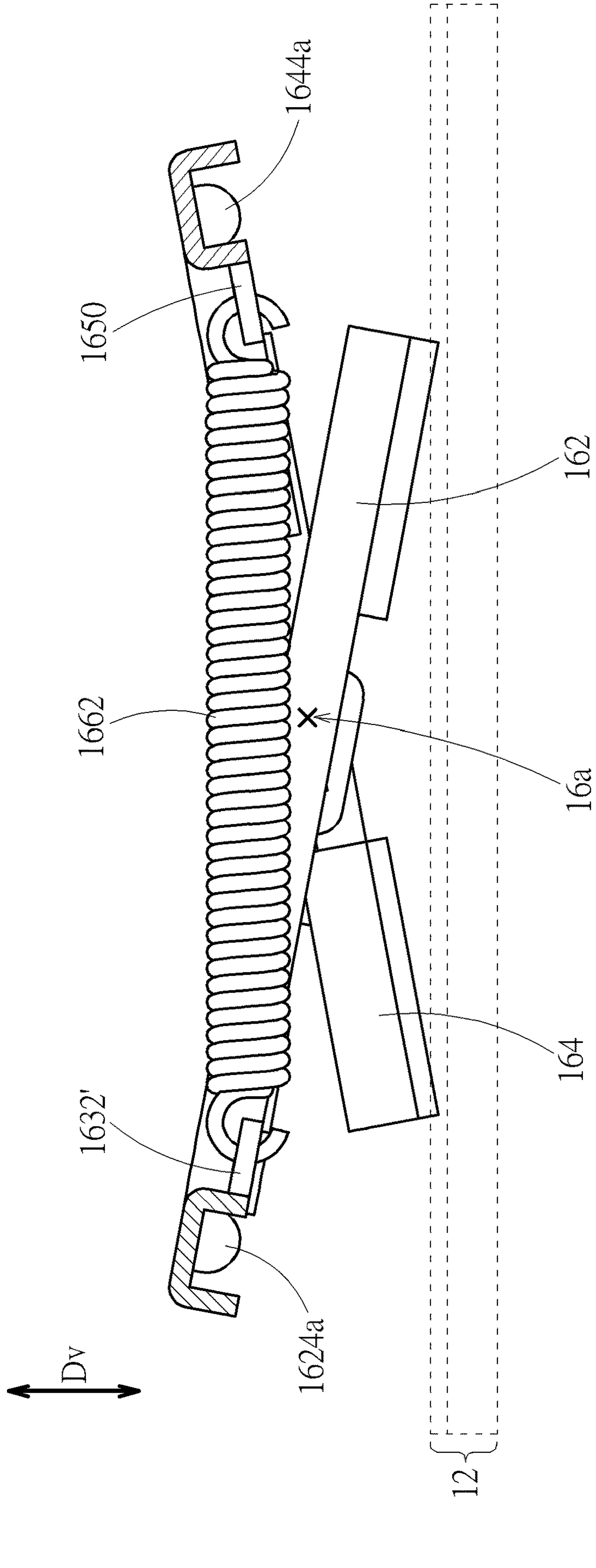
FIG. 13 is a sectional view of the lift mechanism in FIG. 11; therein, the position of the cutting plane thereof is equivalent to the line X-X in FIG. 10, and the profile of the base is shown in dashed lines.

In addition, in the embodiment, the spring structure 166 is connected to the lower portions of the first support 162 and the second support 164 (relative to the rotation axis 16*a*), as shown by FIG. 10 and FIG. 11; however, it is not limited thereto in practice. For example, as shown by FIG. 12 and FIG. 13, the spring structure 166 is connected to the upper portions of the first support 162 and the second support 164 (relative to the rotation axis 16*a*). Therein, for example, the first spring portion 1662 is connected to a portion 1632' of the first support 162 and a portion 1650' of the second support 164. The first spring portion 1662 still can extend parallel to and adjacent to the projection of the side arm portion 1620*a* of the first support 162 and does not enter the central space 16*c*. Although the vertical position of the spring structure 166 changes during the actuation of the spring structure 166 (that is, the spring structure 166 is extended or restored when the supports 162 and 164 rotate relative to each other), so that the spring structure 166 will affect the illumination of the light source, which is disposed on the base 12 corresponding to the central space 16*c*, on the corner light-emitting areas 14*b* (referring to FIG. 10), the spring structure 166 can still keep the central space 16*c* clear (or will not enter the central space 16*c*), that is, the light emitted by the light source can always directly illuminate the main light-emitting area 14*a* (see FIG. 10).

Figure 14:
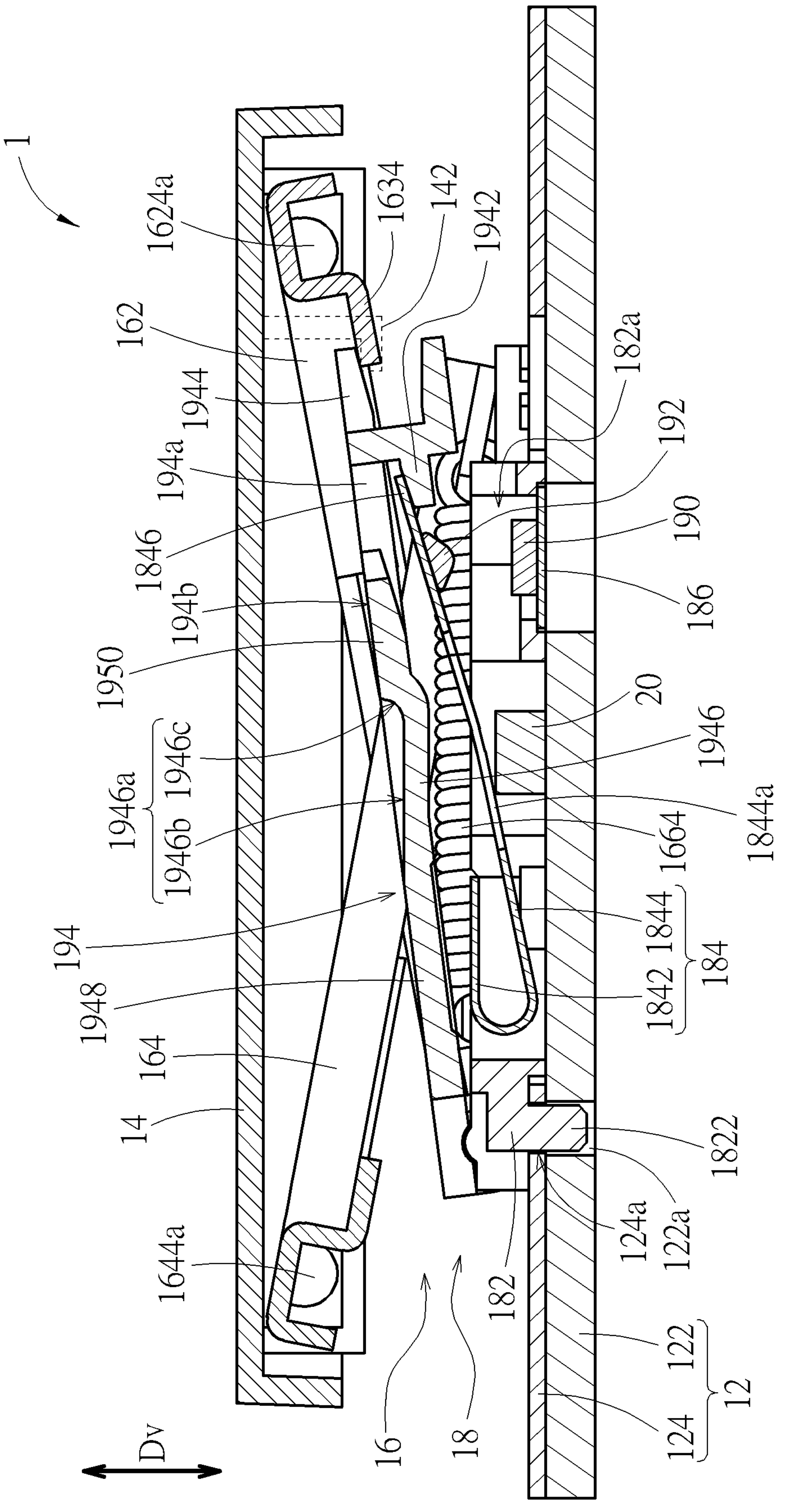
FIG. 14 is a sectional view of the keyswitch structure along the line Y-Y in FIG. 1.

Please refer to FIG. 2, FIG. 3 and FIG. 14. In the embodiment, the base 12 includes a circuit board 122 and a bottom plate 124 stacked on the circuit board 122. The lift mechanism 16 is connected to the base 12 by connecting with the bottom plate 124. In practice, the bottom plate 124 can be formed by, but not limited to, stamping a metal plate. The switch 18 is fixed on the base 12. The circuit board 122 can be, but not limited to, a printed circuit board. The switch 18 can be fixed on the bottom plate 124 and electrically connected to the circuit board 122. The keycap 14 can be pressed to move toward the base 12 through the lift mechanism 16 so as to trigger the switch 18.

Figure 15:
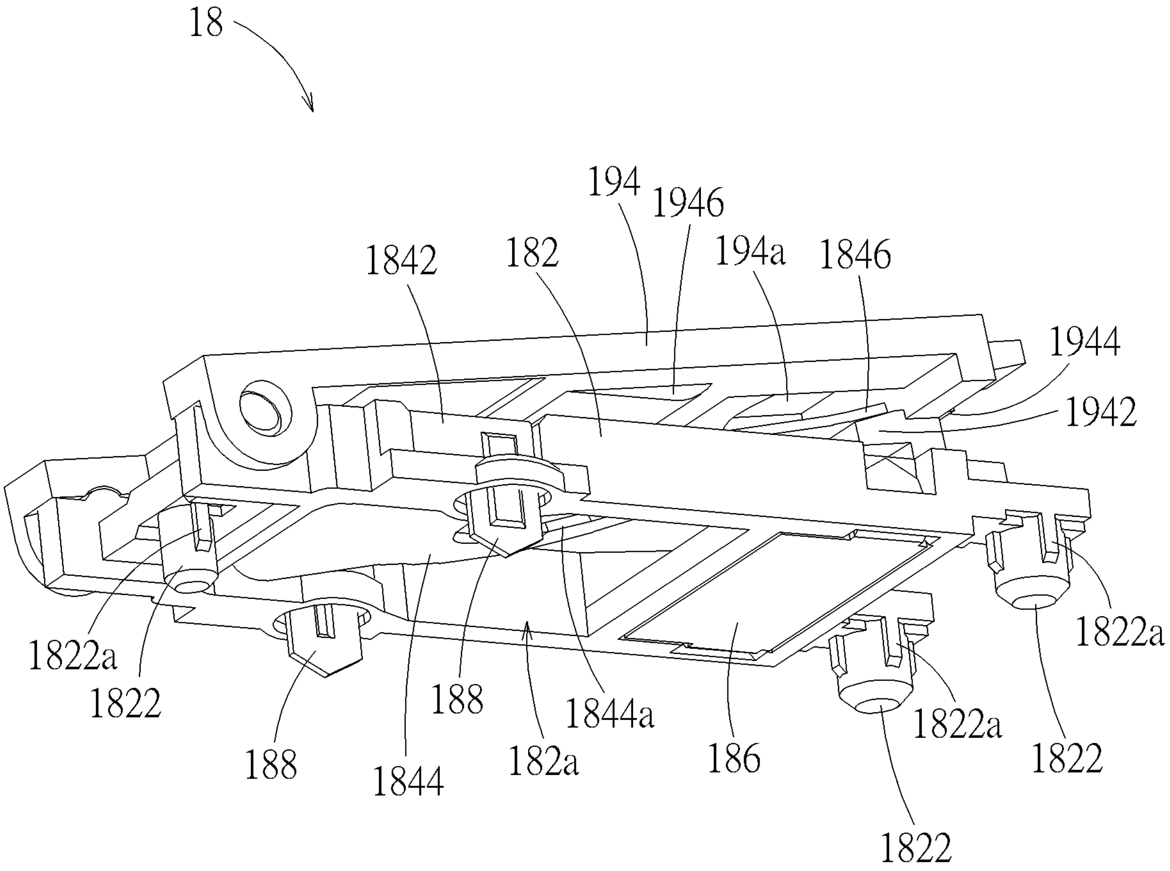
FIG. 15 is a schematic diagram illustrating a switch in FIG. 3 in another view point.
Figure 16:
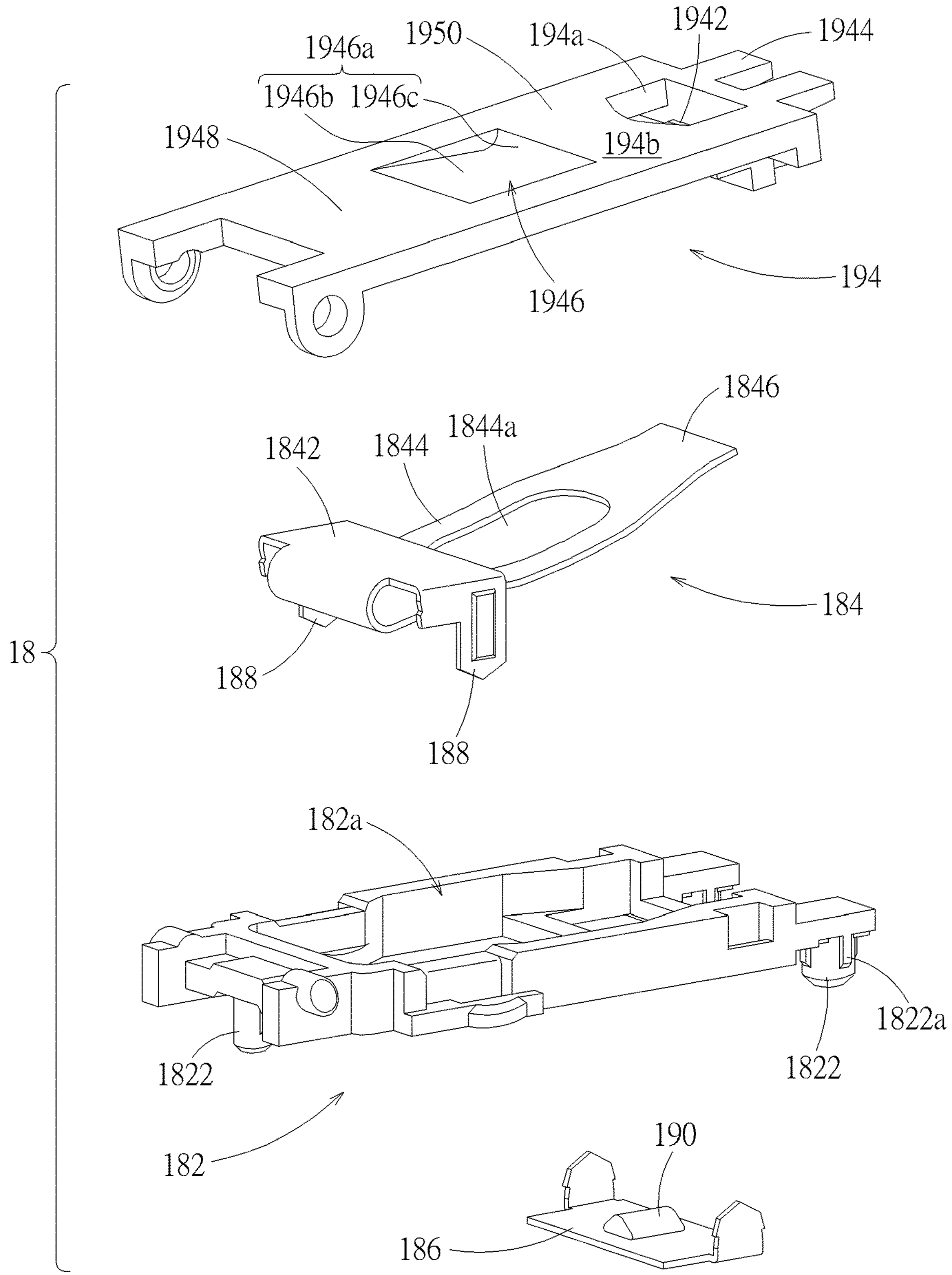
FIG. 16 is an exploded view of the switch in FIG. 3.

Please refer to FIG. 14 to FIG. 16. In the embodiment, the switch 18 includes a mount 182, a resilient part 184, a first contact connecting portion 186, a second contact connecting portion 188, a first switch contact 190, a second switch contact 192, and an intermediate support 194. The mount 182 forms an accommodating space 182*a* and has a plurality of positioning legs 1822. The positioning legs 1822 are inserted into corresponding holes 122*a* and 124*a* of the circuit board 122 and the bottom plate 124. The positioning leg 1822 is provided with ribs 1822*a*. The ribs 1822*a* can structurally interfere with the positioning holes 122*a* and/or the positioning holes 124*a*, so as to provide a certain degree of fixation. In other words, the switch 18 is positioned on the base 12 through the positioning legs 1822, and can be fixed on the base 12 through the ribs 1822*a* of the positioning legs 1822.

The resilient part 184 is accommodated in the accommodating space 182*a* and includes a fixed portion 1842 and a cantilever arm 1844 extending form the fixed portion 1842. The resilient part 184 is fixed to the mount 182 through the fixed portion 1842. The cantilever arm 1844 can be deflected elastically in the vertical direction Dv. On the other hand, the resilient part 184 is partially fixed on the mount 182. Therein, the fixed portion 1842 is an n-shaped structure. The fixed portion 1842 can be fixed to the mount 182 by means of insertion (e.g., inserted into holes of the mount 182) or insert molding (e.g., the mount 182 is an injection part). In addition, the elastic deflection of the cantilever arm 1844 is actually achieved through its structural elasticity. To simplify the description and drawings, the cantilever arm 1844 itself is shown as a rigid body, and the deflection angle of the cantilever arm 1844 is determined by taking the center of curvature of the curved portion (as shown in FIG. 14, i.e., the portion of the cantilever arm 1844 beginning to extend from the base 182) as the deflection center.

The first contact connecting portion 186 is fixed on the mount 182 and exposed from the mount 182. Therein, the first contact connecting portion 186 is a U-shaped structure. The first contact connecting portion 186 can be fixed to the mount 182 by means of insertion (e.g., inserted into holes of the mount 182) or insert molding (e.g., the mount 182 is an injection part). The first contact connecting portion 186 is electrically fixed on the circuit board 122 by surface mount means; however, it is not limited thereto in practice. For example, the first contact connecting portion 186 can be electrically fixed on the circuit board 122 by means of insertion (i.e., inserted down into the circuit board 122). The first switch contact 190 is located in the accommodating space 182*a* and fixed on the first contact connecting portion 186, so that the first switch contact 190 is fixed to the mount 182 through the first contact connecting portion 186 and electrically connected to the circuit board 122. In practice, the first contact connecting portion 186 and the first switch contact 190 may be integrally formed into one piece, e.g., by stamping a metal plate.

The second contact connecting portion 188 is fixed on the mount 182 and exposed from the mount 182. Therein, the second contact connecting portion 188 and the fixed portion 1842 of the resilient part 184 are integrally formed into one piece, so that the second contact connecting portion 188 is fixed to the mount 182 through the fixed portion 1842. The second contact connecting portion 188 includes two pins.

The second contact connecting portion 188 is electrically fixed on the circuit board 122 by means of insertion (i.e., inserting the two pins down into the circuit board 122); however, it is not limited thereto in practice. For example, the second contact connecting portion 188 is electrically fixed on the circuit board 122 by surface mount means. The second switch contact 192 is fixed on the cantilever arm 1844 of the resilient part 184 opposite to the first switch contact 190 and is electrically connected to the second contact connecting portion 188. In practice, the resilient part 184, the second contact connecting portion 188, and the second switch contact 192 can be integrally formed into one piece, e.g., by stamping a metal plate. In this case, the second switch contact 192 is electrically connected to the second contact connecting portion 188 through the cantilever arm 1844 and then connected to the circuit board 122 through the second contact connecting portion 188. The cantilever arm 1844 can be elastically deflected downward in the vertical direction Dv to make the first switch contact 190 contact the second switch contact 192. Therefore, the switch 18 can be fixed on the circuit board 122 at least through the first contact connecting portion 186 and the second contact connecting portion 188.

The intermediate support 194 and the mount 182 are pivotally connected. The resilient part 184 detachably abuts downward against the intermediate support 194 (through the cantilever arm 1844). The intermediate support 194 detachably abuts downward against the lift mechanism 16. As shown by FIG. 14, the resilient part 184 is configured to make the cantilever arm 1844 tend to deflect downward to move the second switch contact 192 toward the first switch contact 190 to make the second switch contact 192 contact the first switch contact 190. The intermediate support 194 has a first abutting portion 1942 and abuts upward against the resilient part 184 (or the cantilever arm 1844 thereof) through the first abutting portion 1942 for controlling the elastic deflection degree of the cantilever arm 1844 of the resilient part 184 in the vertical direction Dv. In other words, in FIG. 14, the resilient part 184 is lifted by the first abutting portion 1942 of the intermediate support 194 and produces a restoring force (capable of driving the cantilever arm 1844 to deflect downward). Therein, the lifted cantilever arm 1844 separates the second switch contact 192 from the first switch contact 190. Furthermore, the intermediate support 194 has a second abutting portion 1944. The first support 162 correspondingly has an abutting portion 1634 on the transverse connecting portion of the first support 162. As described above, the spring structure 166 drives the transverse connecting portion of the first support 162 to move upward, so that the abutting portion 1634 of the first support 162 abuts upward against the second abutting portion 1944 of the intermediate support 194. On the other hand, the intermediate support 194 is pressed downward by the cantilever arm 1844 of the resilient part 184 and thereby abuts downward against the abutting portion 1634 of the first support 162 through the second abutting portion 1944.

Figure 17:
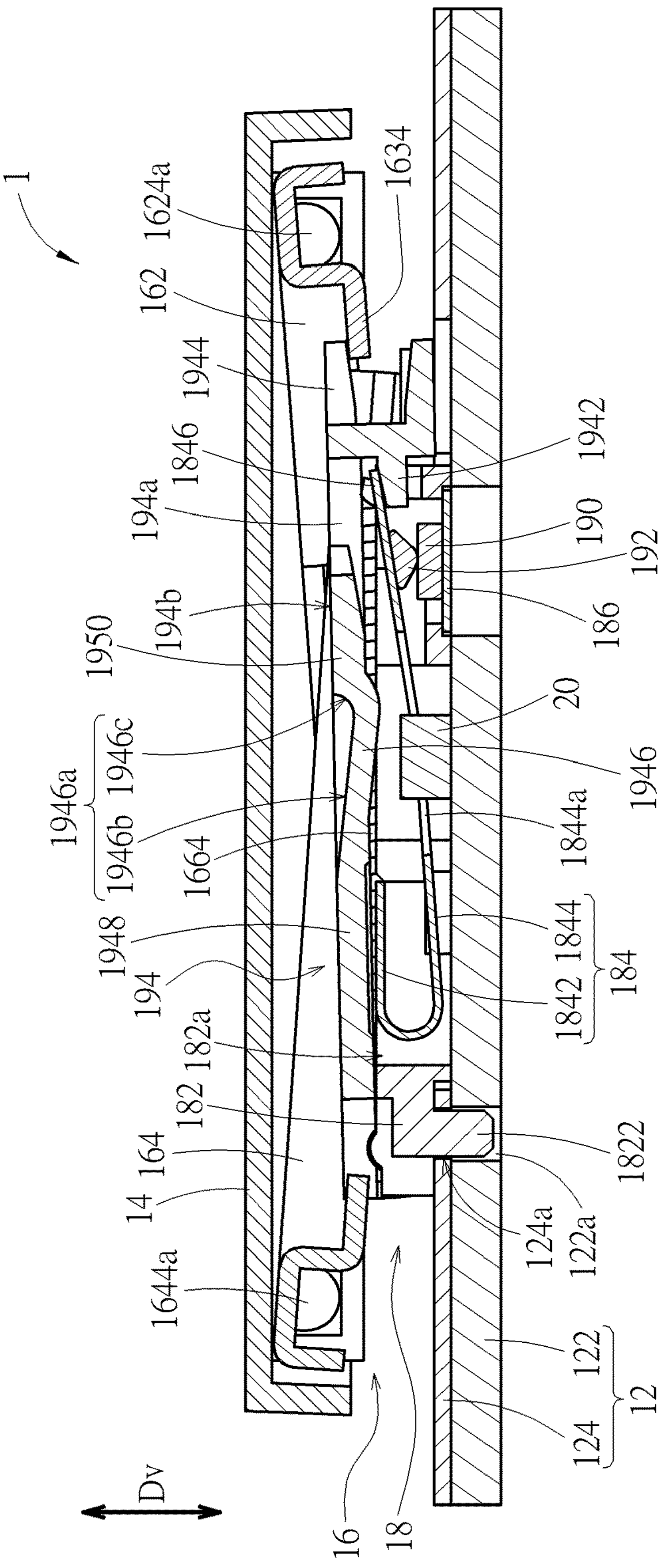
FIG. 17 is a sectional view of the keyswitch structure in FIG. 14 when the keycap is moved downward to a triggering position.
Figure 18:
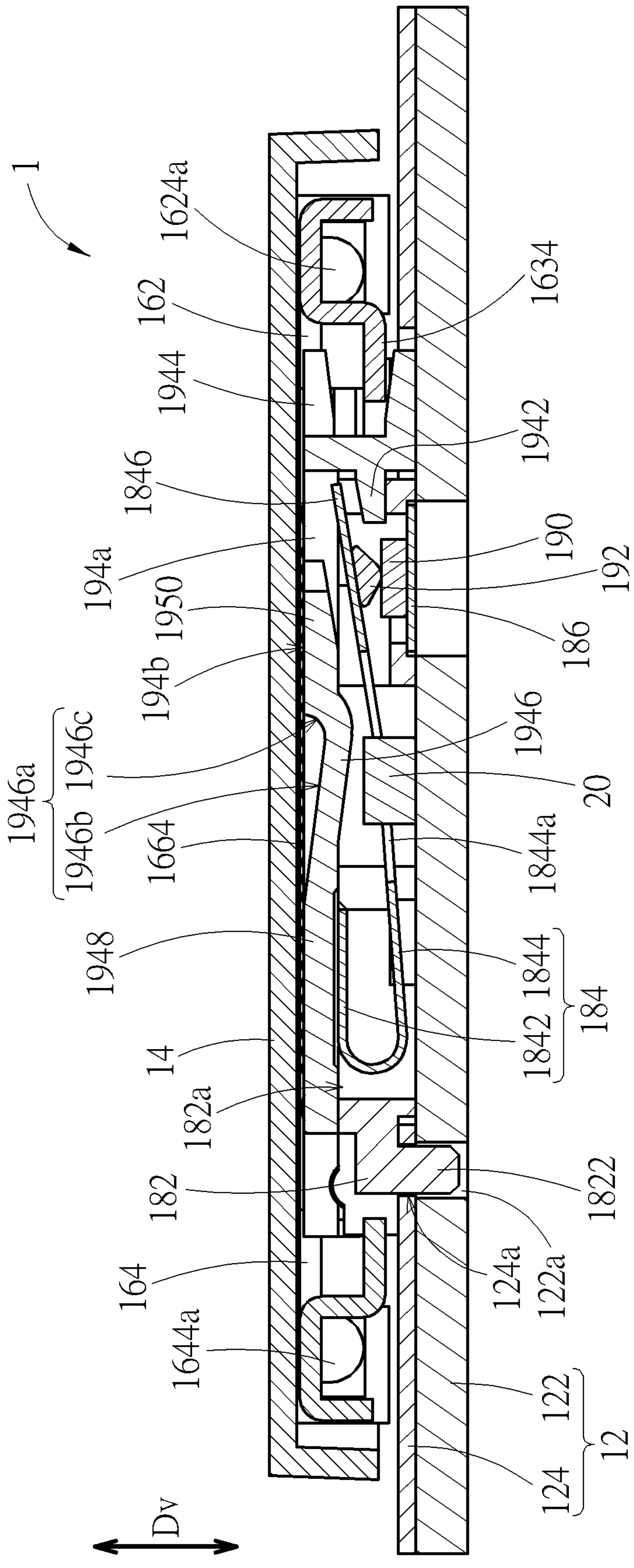
FIG. 18 is a sectional view of the keyswitch structure in FIG. 17 when the keycap is moved further downward to a pressed position.

Please refer to FIG. 14, FIG. 17 and FIG. 18. Therein, FIG. 14 shows that the keycap 14 is at an un-pressed position, that is, the keycap 14 is at the highest point when the keycap 14 is not pressed by a user. FIG. 17 shows that when the keycap 14 is moved downward from the un-pressed position and reaches a triggering position, the second switch contact 192 just contacts the first switch contact 190. FIG. 18 shows that the keycap 14 continues moving downward from the trigger position and reaches a pressed position; at this time, it can be considered that the keycap 14 has been pressed to the lowest point by the user.

Therein, as shown by FIG. 14, when the user has not pressed the keycap 14 (that is, the keycap 14 is at the un-pressed position), the first switch contact 190 and the second switch contact 192 are separate, the first support 162 via its abutting portion 1634 exerts force on the second abutting portion 1944 of the intermediate support 194 upward, and the cantilever arm 1844 of the resilient part 184 exerts force on the first abutting portion 1942 of the intermediate support 194 downward. At this time, the resilient part 184 produces restoring force due to elastic deformation, so that the cantilever arm 1844 of the resilient part 184 tends to deflect downward, and the second switch contact 192 disposed on the cantilever arm 1844 also moves downward (i.e., moves toward the first switch contact 190).

The user can press the keycap 14 to make the keycap 14 move downward from the un-pressed position. Before the keycap 14 moves down to the trigger position (as shown by FIG. 17), the first switch contact 190 and the second switch contact 192 remain separated, the first support 162 keeps exerting upward force on the intermediate support 194, and the resilient part 184 keeps exerting downward force on the intermediate support 194. During the movement of the keycap 14 from the un-pressed position (as shown by FIG. 14) down to the triggering position (as shown by FIG. 17), the restoring force by the resilient part 184 drives the cantilever arm 1844 to deflect downward and abuts against the first abutting portion 1942 of the intermediate support 194. The intermediate support 194 is rotated downward relative to the mount 182 by the force exerted by the cantilever arm 1844 and abuts against the abutting portion 1634 of the first support 162 (that is, the restoring force produced by the resilient part 184 drives the intermediate support 194 downward against the first support 162 through the resilient part 184). The second switch contact 192 moves toward the first switch contact 190 as the cantilever arm 1844 deflects downward. The first support 162 is driven to move downward by the keycap 14 pressed by the user. The first support 162 limits the downward rotation degree of the intermediate support 194 through the abutting portion 1634 and at the same time, logically indirectly limits the downward deflection degree of the cantilever arm 1844 of the resilient part 184 through the intermediate support 194. In the structural configuration of the switch 18 in the embodiment, during the movement of the keycap 14 from the un-pressed position to the triggering position, the intermediate support 194 and the cantilever arm 1844 of the resilient part 184 deflect in the same direction. As shown by FIG. 17, when the keycap 14 reaches the triggering position, the second switch contact 192 just contacts the first switch contact 190, that is, the switch 18 is triggered.

Afterward, when the keycap 14 continues moving downward from the trigger position, the cantilever arm 1844 is no longer deflected downward because the second switch contact 192 contacts the first switch contact 190 and no longer exerts force on the intermediate support 194. In other words, after the second switch contact 192 contacts the first switch contact 190, the contact force between the two contacts 192 and 190 no longer changes. That is, the contact force between the first switch contact 190 and the second switch contact 192 is fixed, and will not change due to the displacement of the keycap 14 pressed down by the user or the force of the user's pressing. This design can greatly reduce the wear and tear of the first switch contact 190 and the second switch contact 192, and prolong the service life of the switch 18. Furthermore, in principle, the intermediate support 194 will continue rotating downward relative to the mount 182 due to its own gravity, and abutting against the abutting portion 1634 of the first support 162 through the second abutting portion 1944 (or the rotation degree of the intermediate support 194 is still limited by the first support 162). When the intermediate support 194 is blocked by base 12 and can no longer rotate down, the first support 162 that continues rotating downward will be separated from the intermediate support 194. As shown by FIG. 18, when the keycap 14 that moves downward from the triggering position reaches the pressed position, the second switch contact 192 still contacts the first switch contact 190, the cantilever arm 1844 of the resilient part 184 is still separated from the intermediate support 194, and the intermediate support 194 is blocked by base 12 so that the first support 162 no longer contacts the intermediate support 194.

In addition, during the movement of the keycap 14 from the triggering position downward to the pressed position, the cantilever arm 1844 of the resilient part 184 no longer deflects relative to the mount 182 while the intermediate support 194 can deflect downward relative to the cantilever arm 1844, so that the intermediate support 194 can structurally interfere with the cantilever arm 1844. Please refer to FIG. 14, and FIG. 16 to FIG. 18. The resilient part 184 has an abutting portion 1846 on an end portion of the cantilever arm 1844. The resilient part 18 detachably abuts against the intermediate support 194 through the abutting portion 1846. The intermediate support 194 is located above the resilient part 184 in the vertical direction Dv and has a recess 194*a* corresponding to the abutting portion 1846. When the keycap 14 is at the pressed position (as shown by FIG. 18), the abutting portion 1846 is located in the recess 194*a*. Therefore, the recess 194*a* is taken as an avoidance space to avoid structural interference between the intermediate support 194 and the resilient part 184. In the embodiment, the recess 194*a* is realized by a through hole; however, it is not limited thereto in practice. For example, a blind hole is formed on the inner side of the intermediate support 194 (towards the accommodating space 182*a* of the mount 182) to replace the above recess 194*a*. Furthermore, in the embodiment, the intermediate support 194 has a top surface 194*b*. The recess 194*a* passes through the top surface 194*b*. When the keycap 14 is at the pressed position (as shown by FIG. 18), the resilient part 184 is lower than the top surface 194*b* in the vertical direction Dv (that is, the end of the cantilever arm 1844 (or the abutting portion 1846) is not beyond the top surface 194*b*), which can avoid structural interference between the cantilever arm 1844 and other structures outside the switch 18. Furthermore, at this time, the intermediate support 194 does not touch the keycap 14, so the intermediate support 194 will not structurally interfere with the keycap 14.

In addition, in the embodiment, the intermediate support 194 detachably abuts downward against the lift mechanism 16 (or the first support 162 thereof); however, in practice, it is practicable to use the keycap 14 to limit the rotation of the intermediate support 194. For example, an L-shaped structure 142 (the profile of which is shown in dashed lines in FIG. 14) is formed by protruding downward directly from the bottom surface of the keycap 14, for replacing the abutting portion 1634 of the first support 162. The intermediate support 194 detachably abuts against the L-shaped structure 142. The rotation of the first support 162 can be limited by the L-shaped structure 142 (in which the abutting portion 1634 of the first support 162 needs to be removed in principle). In the action logic, the L-shaped structure 142 of the keycap 14 is the same as the abutting portion 1634 of the first support 162, so for other descriptions about the L-shaped structure 142, please directly refer to the relevant descriptions mentioned above, which will not be described in addition.

Please refer to FIG. 3 and FIG. 14. In the embodiment, the keyswitch structure 1 also includes a light-emitting part 20 (e.g., but not limited to light-emitting diodes). The light-emitting part 20 is disposed on the base 12 (e.g. directly electrically fixed on the circuit board 122) and within the projection P1 (indicated by a dashed frame in FIG. 3) of the central space 16*c* on the base 12 (or the circuit board 122 thereof). The light-emitting part 20 emits light upward to illuminate the keycap 14, e.g., to provide backlight to the keycap 14. In the embodiment, light emitted by the light-emitting part 20 will pass through the switch 18. There is the resilient part 184 (or the cantilever arm 1844 thereof) and the intermediate support 194 above the light-emitting part 20. The cantilever arm 1844 has a through hole 1844*a* for the light to pass through. The intermediate support 194 is made of light-transmitting material, so that the light can also pass through the intermediate support 194. In the embodiment, the intermediate support 194 has an optical structure 1946 above the light-emitting part 20. The optical structure 1946 has the effect of scattering the light from the light-emitting part 20. The optical structure 1946 has a top concave surface 1946*a*. The top concave surface 1946*a* includes a flat surface of equal thickness structure 1946*b* and a concave surface 1946*c*. As shown by FIG. 14, when the keycap 14 is at the un-pressed position (where the keycap 14 is at the highest point and there is usually no finger covering above it), the flat surface of equal thickness structure 1946*b* is parallel to the circuit board 122 or the upper surface of the keycap 14. In the structural state of the switch at this time (i.e. FIG. 14), in practice, the overall light-emitting uniformity can be fine-tuned by designing the area of the flat surface of equal thickness structure 1946*b* beyond the light-emitting part 20 directly below it in the horizontal direction, and the overlapping range of the vertical projection of the concave surface 1946*c* with the light-emitting part 20. Furthermore, the flat surface of equal thickness structure 1946*b* is also used as a suction surface for robotic arms in automated production. In the intermediate support 194, when the keycap 14 is at the highest point, an inclined lower section 1948 and an inclined upper section 1950 of the optical structure 1946 in the front-rear direction (i.e., in the horizontal direction) respectively form an included angle with the circuit board 122 or the keycap 14. In addition, in practice, the intermediate support 194 may be provided with a through hole (i.e., similar to the avoidance structure of the cantilever arm 1844) for the light to pass through, which will not be described in addition.

In addition, in practice, the functions of the switch 18 can be achieved by other means or structures in which the switch 18 is moved away from the center area of the keyswitch structure 1 so that the light emitted upward by the light-emitting part 20 can directly reach the keycap 14 without being blocked structurally. The switch of the keyswitch structure 1 may be shifted to below the first support 162 or the second support 164. It is practicable to use a structure of the first support 162 or the second support 164 (e.g., a downward protruding structure) to trigger the switch when the keycap 14 moves down. Or, the switch of the keyswitch structure 1 may be shifted to below a downward protruding structure of the keycap 14, so that the downward protruding structure can trigger the switch the keycap 14 moves down. The switch can be realized by a touch switch (e.g., disposed on the circuit board 122) or a membrane circuit board (e.g., replacing the aforementioned circuit board 122 and being stacked above or below the bottom plate 124), etc., which will not be described in addition.

Figure 19:
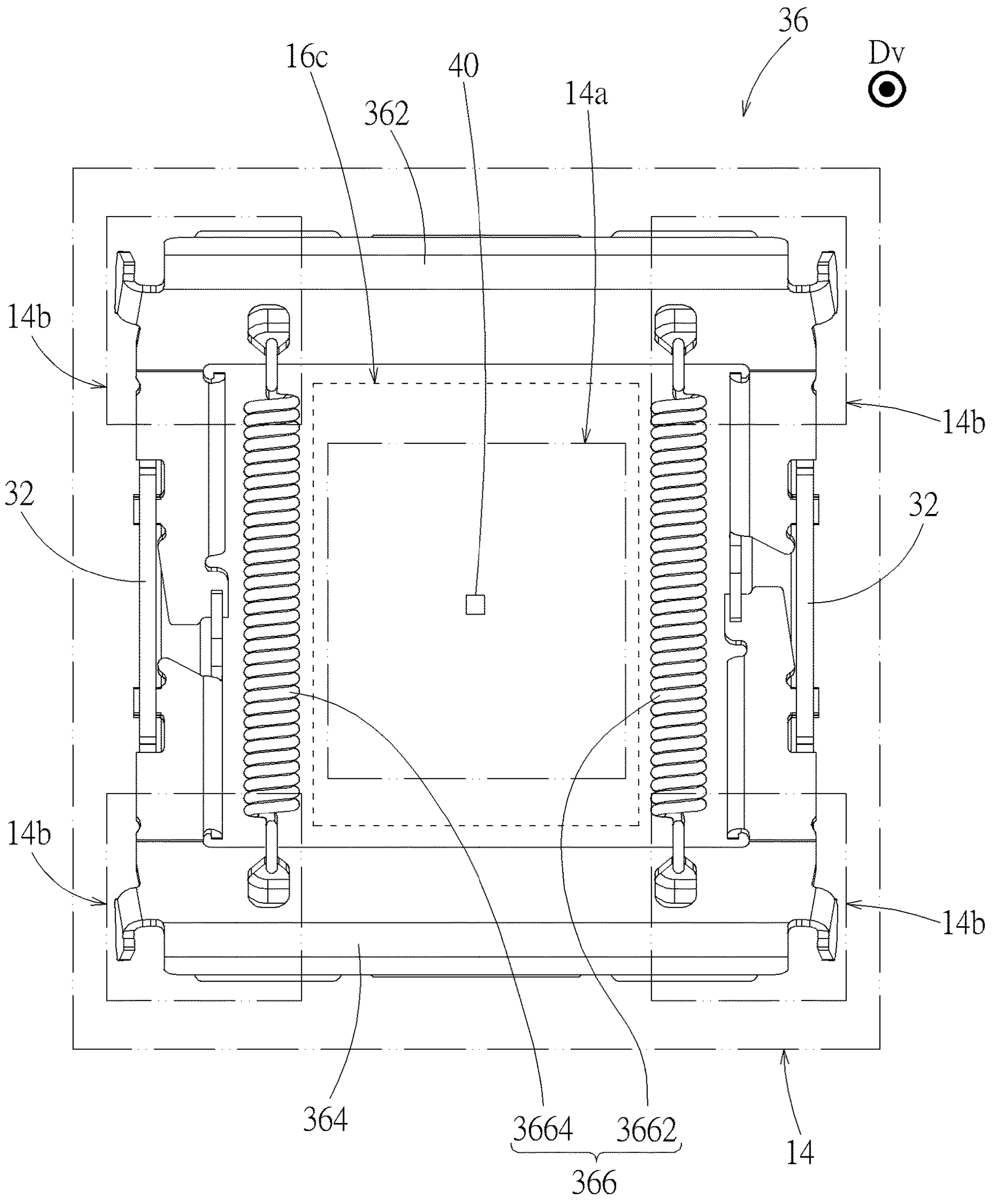
FIG. 19 is a top view of a lift mechanism of a keyswitch structure according to another embodiment.

In addition, in the keyswitch structure 1, the first support 162 and the second support 164 as a whole is an X-shaped supporting structure, but it is not limited thereto in practice. As shown by FIG. 19, a lift mechanism 36 of a keyswitch structure according to another embodiment includes a first support 362 and a second support 364. The first support 362 and the second support 364 respectively show an n-shaped structure. The supports 362 and 364 abut against each other through the two ends of the n-shaped structure (i.e., the ends of the side arms) and can mutually rotate. The first support 362 and the second support 364 respectively are connected to the bottom plate 32 to jointly support the keycap 14 (the profile of the keycap 14 and the corresponding locations of the light-emitting areas 14*a* and 14*b* defined on the keycap 14 are shown in chain lines in the figure) above the bottom plate 32. The side view of the first support 362 and the second support 364 roughly show a V-shaped configuration (or butterfly configuration). The lift mechanism 36 also includes a spring structure 366. The spring structure 366 includes a first spring portion 3662 and a second spring portion 3664, which are connected to the first support 362 and the second support 364 and produces a restoring force to make the keycap 14 able to return to its original position. From the view point of FIG. 19, the first spring portion 3662 and the second spring portion 3664 are located on the inner side of the n-shaped structures of the first support 362 and the second support 364, and extends parallel to and adjacent to the projection of the side arm portions of the first support 362 and the second support 364. The lift mechanism 36 as a whole also can define a central space 36*c* (indicated by a dashed box in FIG. 19), which extends through the whole lift mechanism 36 in the vertical direction Dv. The first spring portion 3662 and the second spring portion 3664 are located on two opposite sides of the central space 36*c* and do not enter the central space 36*c*. Furthermore, in the embodiment, the main light-emitting area 14*a* of the keycap 14 mostly overlaps with the central space 36*c* of the lift mechanism 36. The main light-emitting area 14*a* is located between the first spring portion 3662 and the second spring portion 3664. The corner light-emitting area 14*b* of the keycap 14 does not overlap with the central space 36*c*. The corner light-emitting areas 14*b* partially overlap with the first support 362 and the second support 364. Furthermore, on the whole, the lift mechanism 36 is similar in structure logic to the lift mechanism 16 of the keyswitch structure 1. The main difference is that the first spring portion 3662 and the second spring portion 3664 are connected to keycap connecting portions (or portions close to the keycap 14) of the first support 362 and the second support 364. Therefore, although the vertical position of the spring structure 366 changes during the actuation of the spring structure 366 (that is, the spring structure 366 is extended or restored when the supports 362 and 364 rotate relative to each other), so that the spring structure 366 will affect the illumination of the light source, which is disposed on the base 32 corresponding to the central space 36*c*, on the corner light-emitting areas 14*b*, the spring structure 366 can still keep the central space 36*c* clear (or will not enter the central space 36*c*), that is, the light emitted by the light-emitting part 40 (disposed on the bottom plate 32) can always directly illuminate the main light-emitting area 14*a*. Besides, when the keycap 14 is not pressed, the light emitted by the light-emitting part 40 also can illuminate the corner light-emitting areas 14*b*, which provides an indication effect to the user at least when the keycap 14 is not pressed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lift mechanism for supporting a keycap in a vertical direction, the lift mechanism comprising:

a first support;

a second support, the first support and the second support being connected to each other and being mutually rotatable with respect to a rotation axis; and a spring structure, the spring structure being connected to the first support and the second support, the spring structure driving the first support and the second support to lift the keycap in the vertical direction;

wherein the lift mechanism as a whole defines a central space, the central space extends through the whole lift mechanism, the spring structure does not enter the central space, and when the keycap is not pressed, the spring structure is lower than the rotation axis in the vertical direction; and wherein the first support has a first base connecting portion and a first keycap connecting portion, the second support has a second base connecting portion and a second keycap connecting portion, a distance between the first base connecting portion and a portion of the first support connecting with the spring structure is less than a distance between the first keycap connecting portion and the portion of the first support connecting with the spring structure, and a distance between the second base connecting portion and a portion of the second support connecting with the spring structure is less than a distance between the second keycap connecting portion and the portion of the second support connecting with the spring structure.

2. The lift mechanism according to claim 1, wherein an equivalent force of force exerted by the spring structure on the first support passes through the central space.

3. The lift mechanism according to claim 1, wherein the spring structure comprises a first spring portion and a second spring portion, the first spring portion is connected to the first support and the second support, the second spring portion is connected to the first support and the second support, and the first spring portion and the second spring portion are located on two opposite sides of the central space.

4. A lift mechanism for supporting a keycap in a vertical direction, the lift mechanism comprising:

a first support, the first support having a first protruding portion; and a second support, the second support having a second protruding portion, the first protruding portion extending below the second support and abutting the second support by line contact on a rotation axis, the second protruding portion extending below the first support and abutting the first support by line contact on the rotation axis, the first support and the second support being mutually rotatable with respect to the rotation axis;

wherein the first support has a bottom surface, the first protruding portion has an upper surface and a side surface, the side surface and the upper surface are connected to form a connecting edge, the connecting edge coincides with the rotation axis, the second protruding portion has a first edge and a second edge, the first edge and the second edge coincide with the rotation axis, the first edge abuts against the connecting edge, and the second edge abuts against the bottom surface.

5. The lift mechanism according to claim 4, wherein the first protruding portion has a constraint surface toward the side surface, and the second protruding portion is limitedly located between the side surface and the constraint surface.

6. The lift mechanism according to claim 4, wherein the first support has a third protruding portion, the second support has a fourth protruding portion, the third protruding portion extends below the second support and abuts the second support on the rotation axis, and the fourth protruding portion extends below the first support and abuts the first support on the rotation axis.

7. The lift mechanism according to claim 4, wherein the first support and the second support have the same structure.

8. A keyswitch structure, comprising:

- a base;
- a keycap, the keycap being disposed above the base in a vertical direction;
- a lift mechanism, the lift mechanism being connected to and between the base and the keycap, the keycap being movable relative to the base in the vertical direction through the lift mechanism; and
- a switch, comprising:
  - a mount, the mount being fixed on the base;
  - a resilient part, the resilient part being partially fixed on the mount, the resilient part producing a restoring force;
  - a first switch contact, the first switch contact being fixed on the mount;
  - a second switch contact, the second switch contact being fixed on the resilient part opposite to the first switch contact; and
  - an intermediate support, the intermediate support being pivotally connected to the mount, the resilient part detachably abutting downward against the intermediate support, the intermediate support detachably abutting downward against the lift mechanism or the keycap;

wherein the restoring force drives the second switch contact to move toward the first switch contact, drives the resilient part to abut downward against the intermediate support, and drives the intermediate support to abut downward against the lift mechanism or the keycap through the resilient part; wherein when the keycap is pressed downward to a pressed position, the second switch contact contacts the first switch contact, the resilient part is separated from the intermediate support, and the intermediate support is separated from the lift mechanism or the keycap.

9. The keyswitch structure according to claim 8, wherein when the keycap is at the pressed position, the intermediate support does not touch the keycap.

10. The keyswitch structure according to claim 8, wherein the base comprises a circuit board, the switch is fixed on the circuit board, the switch comprises a first contact connecting portion and a second contact connecting portion, the first contact connecting portion and the second contact connecting portion are fixed on the mount and exposed from the mount, the first contact connecting portion is electrically connected to the first switch contact and the circuit board, the first switch contact is electrically connected to the circuit board through the first contact connecting portion, the second contact connecting portion is electrically connected to the second switch contact and the circuit board, and the second switch contact is electrically connected to the circuit board through the second contact connecting portion.

11. The keyswitch structure according to claim 10, wherein the second contact connecting portion is connected to the second switch contact through the resilient part.

12. The keyswitch structure according to claim 10, wherein the first contact connecting portion or the second contact connecting portion protrudes downward and is inserted into the circuit board.

13. The keyswitch structure according to claim 8, wherein the intermediate support is above the resilient part, the intermediate support has a top surface, and when the keycap is at the pressed position, the resilient part is lower than the top surface in the vertical direction.

14. The keyswitch structure according to claim 8, wherein the intermediate support has a recess, the resilient part has an abutting portion, the resilient part detachably abuts against the intermediate support through the abutting portion, and when the keycap is at the pressed position, the abutting portion is located in the recess.

15. The keyswitch structure according to claim 8, wherein the resilient part comprises a fixed portion and a cantilever arm, the resilient part is fixed on the mount through the fixed portion, and the resilient part detachably abuts downward against the intermediate support through the cantilever arm.

16. The keyswitch structure according to claim 8, wherein the resilient part comprises a cantilever arm detachably abutting downward against the intermediate support, and when the keycap moves downward, the intermediate support is deflected in the same direction as the cantilever arm.

* * * * *